(12) United States Patent
Park et al.

(10) Patent No.: US 11,056,039 B2
(45) Date of Patent: Jul. 6, 2021

(54) SIGNAL PROCESSING DEVICE AND IMAGE DISPLAY APPARATUS INCLUDING THE SAME

(71) Applicant: LG ELECTRONICS INC., Seoul (KR)

(72) Inventors: Kyeongryeol Park, Seoul (KR); Jongchan Kim, Seoul (KR); Jeonghyu Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/517,486

(22) Filed: Jul. 19, 2019

(65) Prior Publication Data
US 2020/0074911 A1    Mar. 5, 2020

(30) Foreign Application Priority Data

Aug. 30, 2018    (KR) .................. 10-2018-0103070

(51) Int. Cl.
   *G09G 3/20*    (2006.01)
   *G06K 9/66*    (2006.01)
   (Continued)

(52) U.S. Cl.
   CPC .......... *G09G 3/2048* (2013.01); *G06K 9/66* (2013.01); *G06T 5/009* (2013.01); *G06T 7/0002* (2013.01); *G06T 7/60* (2013.01); *G06T 19/20* (2013.01); *G09G 3/2003* (2013.01); *H04N 5/57* (2013.01); *H04N 13/122* (2018.05); *H04N 13/133* (2018.05); *G06T 2207/20016* (2013.01); *G06T 2207/20208* (2013.01); *G06T 2207/30168* (2013.01); *G06T 2219/2012* (2013.01)

(58) Field of Classification Search
None
See application file for complete search history.

(56) References Cited

U.S. PATENT DOCUMENTS

2014/0363093 A1* 12/2014 Miller .................. G09G 5/005
                                                               382/235
2018/0063404 A1    3/2018 Chen et al.
(Continued)

FOREIGN PATENT DOCUMENTS

KR    1020190109204    9/2019

OTHER PUBLICATIONS

European Patent Office Application Serial No. 19187548.3, Search Report dated Feb. 7, 2020, 9 pages.

*Primary Examiner* — Tize Ma
(74) *Attorney, Agent, or Firm* — Lee, Hong, Degerman, Kang & Waimey

(57) ABSTRACT

Disclosed is a signal processing device and an image display apparatus including the same. The signal processing device and the image display apparatus comprise: a first reduction unit to receive a image signal and reduce noise of the received image signal, and a second reduction unit to perform grayscale amplification based on the image signal from the first reduction unit, wherein the second reduction unit is configured to perform the grayscale amplification so that upper-limit level of grayscale of the image signal from the first reduction unit is greater than upper-limit level of grayscale of an OSD signal. Accordingly, OSD area may be uniformly displayed regardless of ambient luminance.

18 Claims, 27 Drawing Sheets

(51) Int. Cl.
*G06T 5/00*     (2006.01)
*G06T 19/20*    (2011.01)
*H04N 13/122*   (2018.01)
*H04N 13/133*   (2018.01)
*G06T 7/00*     (2017.01)
*G06T 7/60*     (2017.01)
*H04N 5/57*     (2006.01)

(56) References Cited

U.S. PATENT DOCUMENTS

| | | | |
|---|---|---|---|
| 2018/0278985 A1* | 9/2018 | De Haan | H04N 21/845 |
| 2019/0050968 A1* | 2/2019 | Suzuki | G06T 5/002 |
| 2019/0098274 A1* | 3/2019 | Douady-Pleven | G06T 7/90 |
| 2020/0261763 A1* | 8/2020 | Park | A63B 71/0619 |

* cited by examiner (a)　　　　　　　　(b)　　　　　　　　(c)

(a)

(b)

(a)

(b)

(a)

(b)

(a)

(b)

(a)

(b)

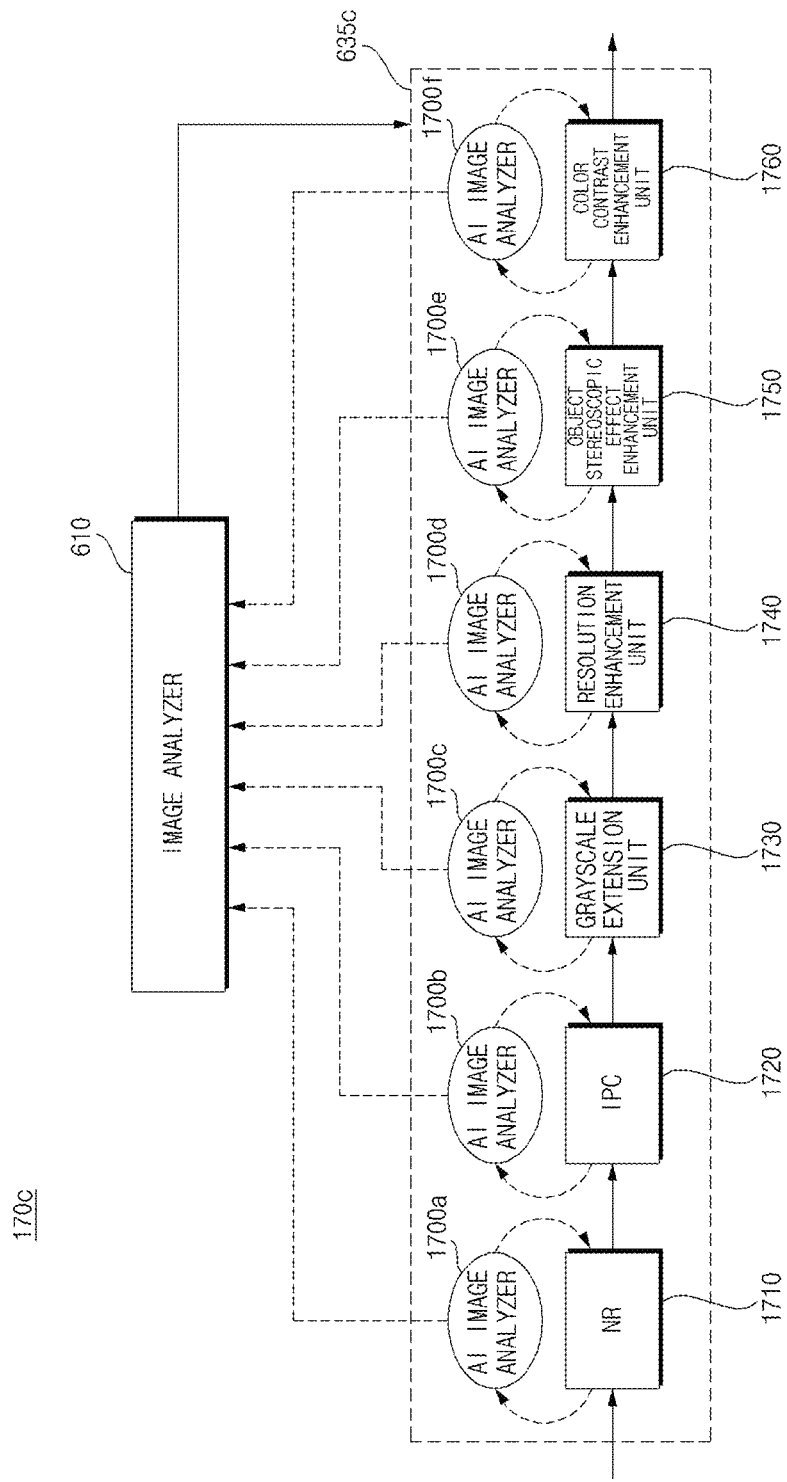

SIGNAL PROCESSING DEVICE AND IMAGE DISPLAY APPARATUS INCLUDING THE SAME

CROSS-REFERENCE TO RELATED APPLICATION

Pursuant to 35 U.S.C. § 119(a), this application claims the benefit of earlier filing date and right of priority to Korean Patent Application No. 10-2018-0103070, filed on Aug. 30, 2018, the contents of which are all hereby incorporated by reference herein in its entirety.

BACKGROUND OF THE INVENTION

1. Field of the Invention

The present disclosure relates to a signal processing device and an image display apparatus including the same and, more particularly, to a signal processing device capable of uniformly displaying OSD area regardless of ambient luminance and an image display apparatus including the same.

2. Description of the Related Art

A signal processing device is a device that performs signal processing based on a signal of a received image so as to display the image.

For example, the signal processing device may receive a broadcast signal or an HDMI signal, perform signal processing based on the broadcast signal or the HDMI signal, and output a signal-processed image signal.

Meanwhile, with the development of camera and broadcasting technologies, resolution and a vertical synchronization frequency of a received image have improved. Specifically, there is a need of performing image quality processing based on an image having resolution of 4K and a vertical synchronization of 120 Hz.

Such image quality processing may be performed by a signal processing device. For this reason, efforts have been made regarding image quality processing based on a high definition image by the signal processing device.

SUMMARY OF THE INVENTION

Therefore, the present disclosure has been made in view of the above problems, and an aspect of the present disclosure is to provide a signal processing device capable of uniformly displaying OSD area regardless of ambient luminance, and an image display apparatus including the same.

Another aspect of the present disclosure is to provide a signal processing device capable of enhancing expression of high grayscale and an image display apparatus including the same.

Another aspect of the present disclosure is to provide a signal processing device capable of gradually enhancing image quality by performing multi-stage image quality processing, and an image display apparatus including the same.

Another aspect of the present disclosure is to provide a signal processing apparatus capable of enhancing image quality by performing multi-stage noise reduction based on a received image, and a display apparatus including the same.

Another aspect of the present disclosure is to provide a signal processing device capable of enhancing image quality by performing multi-stage grayscale extension on a received image, and an image display apparatus including the same.

Another aspect of the present disclosure is to provide a signal processing device capable of enhancing image quality by performing multi-stage resolution enhancement based on a received image, and an image display apparatus including the same.

Another aspect of the present disclosure is to provide a signal processing device capable of outputting image quality of a certain level or higher in response to input images having various qualities, and an image display apparatus including the same.

Another aspect of the present disclosure is to provide a signal processing device capable of uniformly displaying OSD area regardless of ambient luminance in a received image by artificial-intelligently analyzing the object, and an image display apparatus including the same.

In an aspect of the present disclosure, the above and other objects can be accomplished by the provision of a signal processing device and an image display apparatus comprising: a first reduction unit to receive a image signal and reduce noise of the received image signal, and a second reduction unit to perform grayscale amplification based on the image signal from the first reduction unit, wherein the second reduction unit is configured to perform the grayscale amplification so that upper-limit level of grayscale of the image signal from the first reduction unit is greater than upper-limit level of grayscale of an OSD signal.

The second reduction unit may not perform grayscale amplification with respect to the OSD signal.

The OSD signal may be input to the second reduction unit, and the second reduction unit may perform grayscale amplification on an area except for an OSD area corresponding to the OSD signal.

The signal processing device and the image display apparatus further comprises an HDR processor to receive the image signal and perform grayscale conversion on the received image signal, the first reduction unit may reduce noise of grayscale-converted image signal received from the HDR processor, and the upper-limit level of the grayscale amplified by the second reduction unit may be varied according to the grayscale conversion mode performed by the HDR processor.

When the second grayscale conversion mode in which the low grayscale is not emphasized compared to the second gradation mode is performed in the HDR processor, the second reduction unit may perform not a third grayscale conversion mode corresponding to the first grayscale conversion mode but a forth grayscale conversion mode corresponding to the second grayscale conversion mode, and upper-limit level of the grayscale of the forth grayscale conversion mode may be greater than upper-limit level of the grayscale of third grayscale conversion mode.

The HDR processor may perform grayscale conversion based on the first grayscale conversion mode in which low grayscale is highlighted compared to high grayscale and the high grayscale is saturated, or the second grayscale conversion mode in which the low grayscale and the high grayscale are converted uniformly.

When the second grayscale conversion mode may be performed in the HDR processor, the second reduction unit is configured to perform not a third grayscale conversion mode corresponding to the first grayscale conversion mode but a forth grayscale conversion mode corresponding to the second grayscale conversion mode, upper-limit level of the grayscale of the forth grayscale conversion mode may be greater than upper-limit level of the grayscale of third grayscale conversion mode.

An output vale of low grayscale in the second grayscale conversion mode may be smaller than an output value of low grayscale in the first grayscale conversion mode.

The first reduction unit may perform multi-stage noise reduction based on grayscale-converted image signal received from the HDR processor.

The first reduction unit may perform increase of grayscale resolution in a first-stage, and the second reduction unit may perform increase of grayscale resolution in a second-stage.

The signal processing device and the image display apparatus further comprises an enhancement unit positioned between the first reduction unit and the second reduction unit and configured to perform multi-stage resolution enhancement based on a noise-reduced image signal received from the first reduction unit.

The first reduction unit may comprise a plurality of noise reduction units configured to reduce noise of the received image signal in multiple stages.

Each of the plurality of noise reduction units may comprise a temporal noise reduction unit configured to perform temporal noise reduction using previous frame data, and a spatial noise reduction unit configured to perform spatial noise reduction using data around current frame data.

When the received image signal is an interlaced video, a first noise reduction unit of the plurality of noise reduction units may perform interlaced progressive conversion.

The second reduction unit may perform grayscale extension on an area with a first luminance or higher first luminance the within the image signal.

The first reduction unit may comprise a first noise reduction unit for performing first-stage noise reduction based on the received image signal, a second noise reduction unit for performing second-stage noise reduction based on the image signal from the first noise reduction unit, and the second reduction unit may perform grayscale amplification based on the image signal from the second noise reduction unit.

BRIEF DESCRIPTION OF THE DRAWINGS

The embodiments will be described in detail with reference to the following drawings in which like reference numerals refer to like elements wherein:

FIGS. 8A to 17 are diagrams referred to for describing operation of the signal processing device shown in FIG. 7.

DETAILED DESCRIPTION OF THE EMBODIMENTS

Hereinafter, the present disclosure will be described in more detail with reference to the accompanying drawings.

In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other.

Figure 1:
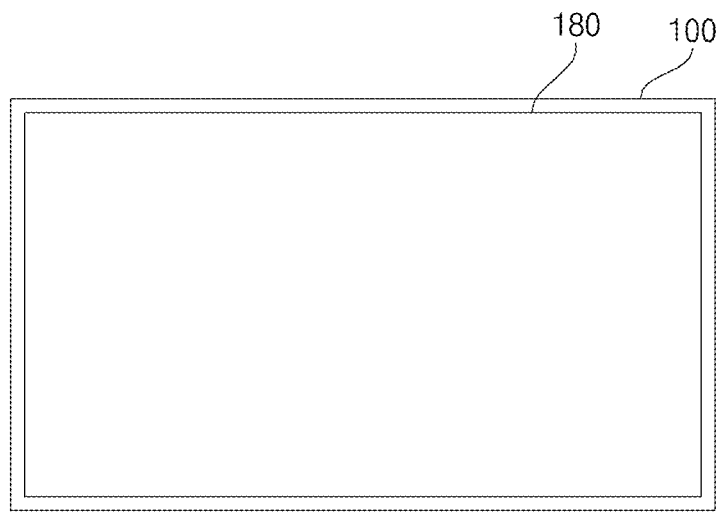
FIG. 1 is a diagram illustrating an image display apparatus according to an embodiment of the present disclosure.

FIG. 1 is a diagram illustrating an image display apparatus according to an embodiment of the present disclosure.

Referring to the drawing, an image display apparatus 100 may include a display 180.

Meanwhile, the display 180 may be implemented as any one of various panels. For example, the display 180 may be any one of a Liquid Crystal Display (LCD) panel, an organic light emitting panel (OLED panel), an inorganic light emitting panel (an LED panel), etc.

The present disclosure will be described mainly about the case where the display 180 includes an organic light emitting panel (OLED).

Meanwhile, compared to an LCD panel, the organic light emitting panel (OLED panel) has a fast response speed and is excellent at expressing color.

Accordingly, when the display 180 includes an organic light emitting panel, it is desirable that a signal processor 170 (see FIG. 2) in the image display apparatus 100 performs image quality processing to correspond to characteristics of the organic light emitting panel.

Meanwhile, the image display apparatus 100 shown in FIG. 1 may be a TV, a monitor, a tablet Pc, a mobile device, etc.

Figure 2:
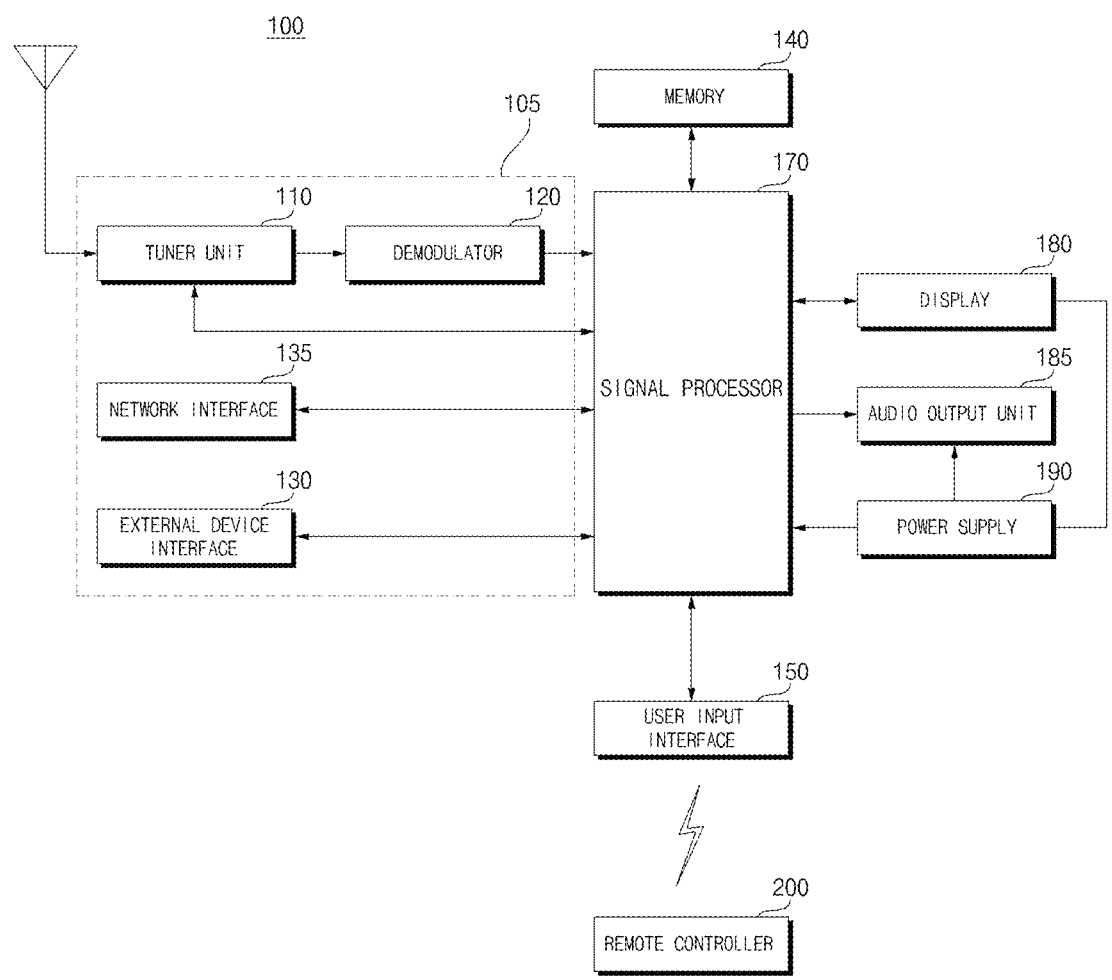
FIG. 2 is a block diagram of the image display apparatus shown in FIG. 1.

FIG. 2 is a block diagram of the image display apparatus shown in FIG. 1.

Referring to FIG. 2, the image display apparatus 100 according to an embodiment of the present disclosure may include an image receiver 105 a memory 140, a user input interface 150, a sensor unit (not shown), a signal processor 170, the display 180, and an audio output unit 185.

The image receiving unit 105 may include a tuner unit 110, a demodulator 120, a network interface 135, and an external device interface 130.

Unlike FIG. 2, the image receiver 105 may include only the tuner unit 110, the demodulator 120, and the external device interface 130. That is, the image receiver 105 may not include the network interface 135.

The tuner unit 110 selects a Radio Frequency (RF) broadcast signal corresponding to a channel selected by a user or an RF broadcast signal corresponding to each of pre-stored channels from among a plurality of RF broadcast signals received through an antenna (not shown). In addition, the tuner unit 110 downconverts the selected RF broadcast signal into an Intermediate Frequency (IF) signal or a baseband Audio/Video (A/V) signal.

For example, if the selected RF broadcast signal is a digital broadcast signal, the tuner unit 110 downconverts the selected RF broadcast signal into a digital IF signal. On the other hand, if the selected RF broadcast signal is an analog broadcast signal, the tuner unit 110 downconverts the selected RF broadcast signal into an analog baseband A/V signal (CVBS/SIF). That is, the tuner unit 110 may process a digital broadcast signal or an analog broadcast signal. The analog baseband A/V signal, CVBS/SIF from the tuner unit 110 may be provided directly to the signal processor 170.

Meanwhile, the tuner unit 110 may include a plurality of tuners for receiving broadcast signals of a plurality of channels, or a single tuner for simultaneously receiving broadcast signals of a plurality of channels.

The demodulating unit 120 receives the digital IF signal from the tuner unit 110 and demodulates the digital IF signal.

The demodulating unit 120 may perform demodulation and channel decoding on the digital IF signal, thereby obtaining a stream signal TS. The stream signal TS may be a signal in which an image signal, an audio signal and/or a data signal are multiplexed.

The stream signal output from the demodulating unit 120 may be input to the signal processor 170 and then subjected to demultiplexing and A/V signal processing. The signal processor 170 outputs the processed video and audio signals to the display 180 and the audio output unit 185, respectively.

The external device interface unit 130 may transmit and receive data to and from a connected external device (not shown) such as a set-top box. For this purpose, the external device interface 130 may include an A/V Input/Output (I/O) unit (not shown).

The external device interface unit 130 may be connected to an external device, wirelessly or wiredly, such as a Digital Versatile Disk (DVD) player, a Blu-ray Disk (BD) player, a game console, a camera, a camcorder, a computer (e.g. a laptop computer), or a set-top box. Then, the external device interface 130 may transmit and receive signals to and from the external device.

The A/V input and output unit may receive audio and image signals from an external device, and a wireless communication unit (not shown) may conduct short-range wireless communication with another electronic device.

The external device interface unit 130 may exchange data with a nearby mobile terminal 600 through the wireless communication unit (not shown). Particularly, the external device interface 130 may receive device information, executed application information, an application image, and so on from the mobile terminal 600 in a mirroring mode.

The network interface unit 135 serves as an interface between the image display apparatus 100 and a wired/wireless network such as the Internet. For example, the network interface 135 may receive content or data from the Internet or from a Content Provider (CP) or a Network Provider (NP) over a network.

Meanwhile, the network interface unit 135 may include a wireless communication unit (not shown).

The memory 140 may store programs necessary for the signal processor 170 to process signals and control, and may also store a signal-processed image, audio, or data signal. In addition, the memory 140 may also temporarily store an audio, video or data signal received from the external device interface 130. The memory 140 may store information about broadcast channels by the channel-add function.

While the memory 140 is shown in FIG. 2 as configured separately from the signal processor 170, to which the present disclosure is not limited, the memory 140 may be incorporated into the signal processor 170.

The user input interface unit 150 transmits a signal received from the user to the signal processor 170 or transmits a signal received from the signal processor 170 to the user.

For example, the user input interface 150 may receive user input signals such as a power-on/off signal, a channel selection signal, and a screen setting signal from a remote controller 200, provide the signal processor 170 with user input signals received from local keys (not shown), such as inputs of a power key, a channel key, a volume key, and a setting value, transmit a user input signal received from the sensor unit (not shown) that senses a user gesture to the signal processor 170, or transmit a signal received from the signal processor 170 to the sensor unit (not shown).

The signal processor 170 may demultiplex a stream signal received from the tuner unit 110, the demodulator 120, the network interface 135, or the external device interface 130 into a number of signals, and process the demultiplexed signals into audio and image signals.

For example, the signal processor 170 may receive a broadcast signal or an HDMI signal received by the image receiving unit 105, and output a processed image signal by processing the received broadcast signal or the received HDMI signal.

The image signal processed by the signal processor 170 may be displayed as an image corresponding to the image signal on the display 180. The image signal processed by the signal processor 170 may also be transmitted to an external output device through the external device interface 130.

The audio signal processed by the signal processor 170 may be output to the audio output unit 185. Also, the audio signal processed by the signal processor 170 may be transmitted to an external output device through the external device interface 130.

While not shown in FIG. 2, the signal processor 170 may include a Demultiplexer (DEMUX) and a video processor, which will be described later with reference to FIG. 3. That is, the signal processor 170 may process various types of signals and accordingly may be implemented in the form of a system On Chip (SOC). It will be described in more detail with reference to FIG. 3.

In addition, the signal processor 170 may provide overall control to the image display apparatus 100. For example, the signal processor 170 may control the tuner unit 110 to select an RF broadcast signal corresponding to a user-selected channel or a pre-stored channel.

The signal processor 170 may control the image display apparatus 100 according to a user command received through the user input interface 150 or according to an internal program.

The signal processor 170 may control the display 180 to display an image. The image displayed on the display 180 may be a Two-Dimensional (2D) or Three-Dimensional (3D) still image or video.

The signal processor 170 may control a particular 2D object in the image displayed on the display 180. For example, the particular 2D object may be at least one of a linked Web page (e.g. from a newspaper or a magazine), an Electronic Program Guide (EPG), a menu, a widget, an icon, a still image, a video, or text.

The signal processor 170 may locate the user based on an image captured by a camera unit (not shown). For example, the signal processor 170 may determine the distance (a z-axis coordinate) between the user and the image display apparatus 100. In addition, the signal processor 170 may determine x-axis and y-axis coordinates corresponding to the position of the user on the display 180.

The display 180 generates drive signals by converting a processed image signal, a processed data signal, an On Screen Display (OSD) signal, and a control signal received from the signal processor 170 or an image signal, a data signal, and a control signal received from the external device interface 130.

Meanwhile, the display 180 may also be a touch screen that can be used not only as an output device but also as an input device.

The audio output unit 185 may receive a processed audio signal from the signal processor 170 and output the received audio signal as voice.

The camera unit (not shown) captures a user. The camera unit may include, but not limited to, a single camera. When needed, the camera unit may include a plurality of cameras. Image information captured by the camera unit may be provided to the signal processor 170.

The signal processor 170 may sense a user's gesture from a captured image received from the camera unit or from signals received from the sensor unit (not shown) alone or in combination.

A power supply 190 supplies power across the whole image display apparatus 100. Particularly, the power supply 190 may supply power to the signal processor 170 which may be implemented as a System On Chip (SOC), the display 180 for displaying an image, the audio output unit 185 for outputting an audio signal, and so on.

Specifically, the power supply 190 may include a converter for converting Alternating Current (AC) power to Direct Current (DC) power, and a DC/DC converter for converting the level of DC power.

The remote controller 200 transmits a user input to the user input interface 150. For the transmission of a user input, the remote controller 200 may operate based on various communication standards such as Bluetooth, RF communication, IR communication, Ultra WideBand (UWB), and ZigBee. In addition, the remote controller 200 may receive an image signal, an audio signal and/or a data signal from the user input interface 150 and may output the received signal as an image or sound.

The above-described image display apparatus 100 may be a fixed or mobile digital broadcast receiver.

Figure 15:
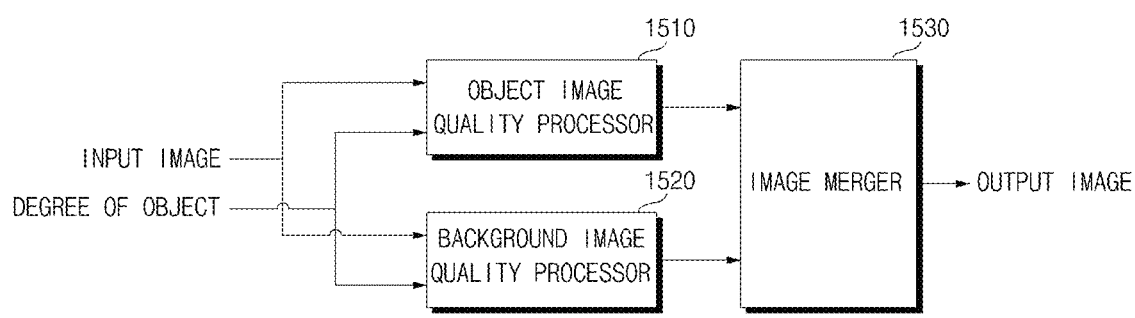

The block diagram of the image display apparatus 100 illustrated in FIG. 2 is an exemplary embodiment of the present disclosure. The image display apparatus 100 is shown in FIG. 15 as having a number of components in a given configuration. However, the image display apparatus 100 may include fewer components or more components than those shown in FIG. 15. Also, two or more components of the image display apparatus 100 may be combined into a single component or a single component thereof may be separated into two more components. The functions of the components of the image display apparatus 100 as set forth herein are illustrative in nature and may be modified, for example, to meet the requirements of a given application.

Figure 3:
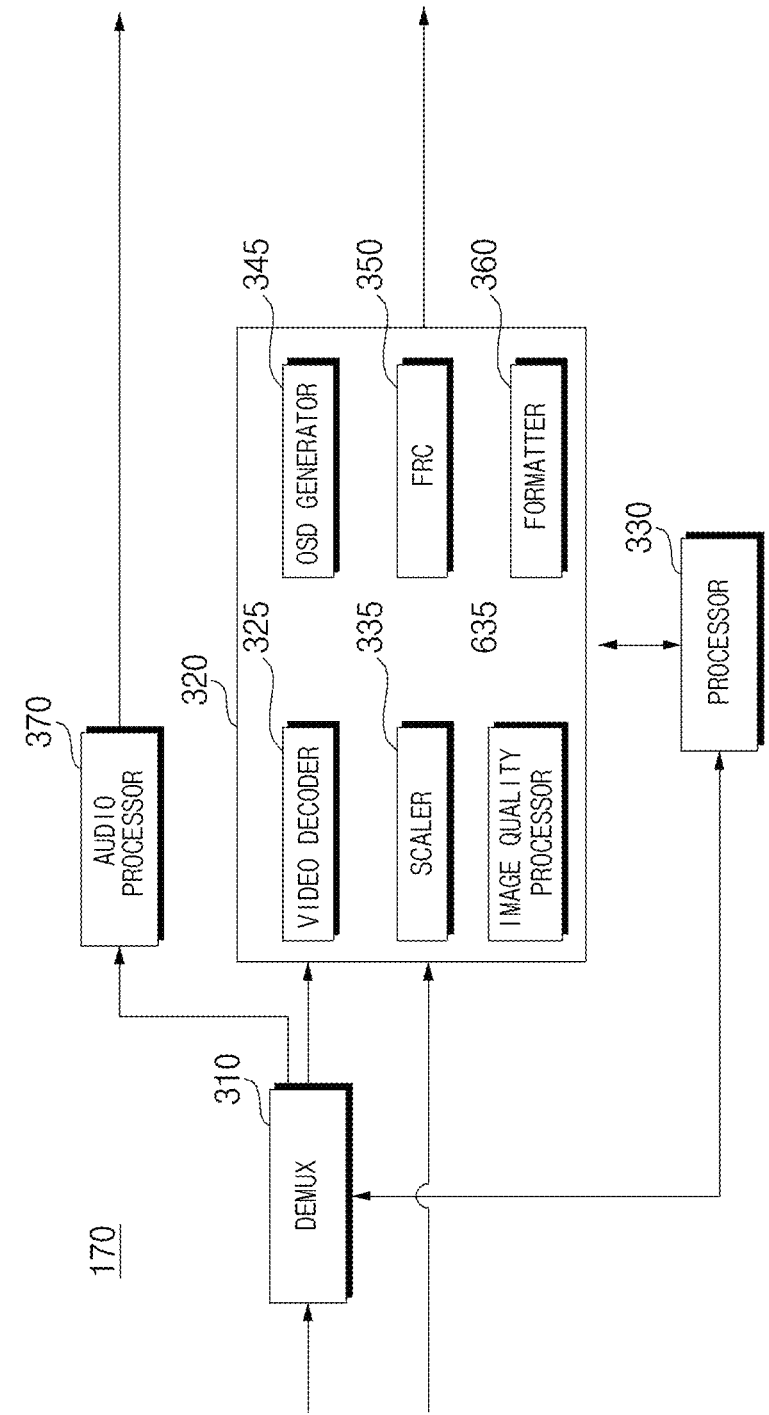
FIG. 3 is a block diagram of a signal processor illustrated in FIG. 2.

FIG. 3 is a block diagram of the signal processor illustrated in FIG. 2.

Referring to FIG. 3, the signal processor 170 may include a DEMUX 310, an image processor 320, a processor 330, and an audio processor 370. The signal processor 170 may further include a data processor (not shown).

The DEMUX 310 demultiplexes an input stream. For example, the DEMUX 310 may demultiplex an MPEG-2 TS into an image signal, an audio signal, and a data signal. The input stream signal may be received from the tuner unit 110, the demodulator 120, or the external device interface 130.

The image processor 320 may perform signal processing based on a received image. For example, the image processor 320 may perform image processing based on an image signal demultiplexed by the DEMUX 310.

To this end, the image processor 320 may include a video decoder 325, a scaler 335, an image quality processor 635, a video encoder (not shown), an OSD generator 340, a Fame Rate Converter (FRC) 350, a formatter 360, etc.

The video decoder 325 decodes the demultiplexed image signal, and the scaler 335 scales resolution of the decoded image signal so that the image signal may be displayed on the display 180.

The video decoder 325 may be provided with decoders that operate in conformance to various standards. For example, the video decoder 325 may include, for example, an MPEG-2 decoder, an H.264 decoder, a 3D video decoder for a color image a depth image, a decoder for multi-view images, and so on.

The scaler 335 may scale a received image signal which is decoded by the image decoder 325.

For example, when the size or resolution of a received image signal is small and low, the scaler 335 may upscale the received image signal. When the size or resolution of a received image signal is great and high, the scaler 335 may downscale the received image signal.

The image quality processor 635 may perform image quality processing based on a received image signal which is decoded by the image decoder 325.

For example, the image quality processor 635 may reduce noise of a received image signal, extend grayscale of the received image signal, enhance image resolution, perform High Dynamic Range (HDR)-based signal processing, change a frame rate, or perform image quality processing to corresponding to characteristics of a panel, especially, an organic light emitting panel.

The OSD generator 340 generates an OSD signal autonomously or according to a user input. For example, the OSD generator 340 may generate signals by which a variety of information is displayed as graphics or text on the display 180, according to user input signals. The OSD signal may include various data such as a User Interface (UI), a variety of menus, widgets, and icons. The generated OSD signal may include a 2D or 3D object.

Further, the OSD generator 340 may generate a pointer to be displayed on the display 180 based on a pointing signal received from the remote controller 200. Especially, the pointer may be generated from a pointing signal processor (not shown), which may reside in the OSD generator 340. Obviously, the pointing signal processor may be configured separately from the OSD generator 240.

The FRC 350 may change the frame rate of the received image signal or simply output the image signal without frame rate conversion.

The formatter 360 may change the format of a received image signal to an image signal to be displayed on the display.

Particularly, the formatter 360 may change the format of a received image signal to correspond to characteristics of a display panel.

Meanwhile, the formatter 360 may change the format of an image signal. For example, the formatter 360 may change the format of a 3D image signal to one of various 3D formats such as a side by side format, a top/down format, a frame sequential format, an interlaced format, and a checker format.

The processor 330 may control overall operations in the image display apparatus 100 or the signal processor 170.

For example, the processor 330 may control the tuner unit 110 to tune to an RF broadcast signal corresponding to a user-selected channel or a pre-stored channel.

The processor 330 may control the image display apparatus 100 according to a user command received through the user input interface 150 or according to an internal program.

In addition, the processor 330 may control data transmission through the network interface 135 or the external device interface 130.

In addition, the processor 330 may control operations of the DEMUX 310 and the image processor 320 in the signal processor 170.

The audio processor 370 of the signal processor 170 may process the demultiplexed audio signal. For the audio signal processing, the audio processor 370 may have a plurality of decoders.

The audio processor 370 of the signal processor 170 may also adjust the bass, treble, and volume of the audio signal.

The data processor (not shown) of the signal processor 170 may process the data signal obtained by demultiplexing the input stream signal. For example, if the demultiplexed data signal is a coded data signal, the data processor may decode the coded data signal. The coded data signal may be an EPG which includes broadcasting information specifying the start time, end time, and the like of a scheduled broadcast program of each channel.

Meanwhile, the block diagram of the signal processor 170 illustrated in FIG. 3 is purely exemplary. Depending upon the specifications of the signal processor 170 in actual implementation, the components of the signal processor 170 may be combined or omitted or new components may be added.

In particular, the FRC 350 and the formatter 360 may be provided separately from the image processor 320.

Figure 4A:
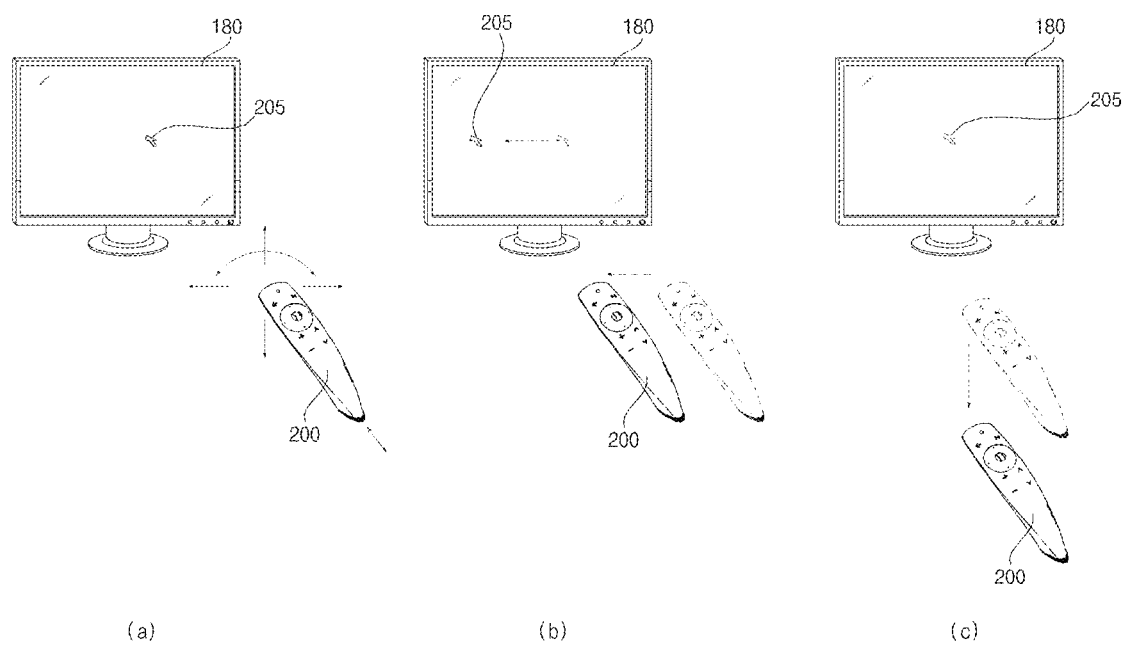
FIG. 4A is a diagram illustrating a method for controlling a remote controller illustrated in FIG. 2.

FIG. 4A is a diagram illustrating a method for controlling the remote controller illustrated in FIG. 2.

(a) of FIG. 4A illustrates a pointer 205 representing movement of the remote controller 200, displayed on the display 180.

The user may move or rotate the remote controller 200 up and down, side to side ((b) of FIG. 4A), and back and forth ((c) of FIG. 4A). The pointer 205 displayed on the display 180 corresponds to movement of the remote controller 200. Since the pointer 205 moves in accordance with the movement of the remote controller 200 in a 3D space, the remote controller 200 may be referred to as a spatial remote controller or a 3D pointing device.

Referring to (b) of FIG. 4A, if the user moves the remote controller 200 to the left, the pointer 205 moves to the left on the display 180.

A sensor of the remote controller 200 detects the movement of the remote controller 200 and transmits motion information corresponding to the result of the detection to the image display apparatus. Then, the image display apparatus may determine the movement of the remote controller 200 based on the motion information received from the remote controller 200, and calculate the coordinates of a target point to which the pointer 205 should be shifted in accordance with the movement of the remote controller 200 based on the result of the determination. The image display apparatus then displays the pointer 205 at the calculated coordinates.

Referring to (c) of FIG. 4A, while pressing a predetermined button of the remote controller 200, the user moves the remote controller 200 away from the display 180. Then, a selected area corresponding to the pointer 205 may be zoomed in and enlarged on the display 180. On the contrary, if the user moves the remote controller 200 toward the display 180, the selection area corresponding to the pointer 205 is zoomed out and thus contracted on the display 180. On the other hand, when the remote controller 200 moves away from the display 180, the selection area may be zoomed out and when the remote controller 200 approaches the display 180, the selection area may be zoomed in.

With the predetermined button pressed in the remote controller 200, the up, down, left and right movements of the remote controller 200 may be ignored. That is, when the remote controller 200 moves away from or approaches the display 180, only the back and forth movements of the remote controller 200 are sensed, while the up, down, left and right movements of the remote controller 200 are ignored. Unless the predetermined button is pressed in the remote controller 200, the pointer 205 moves in accordance with the up, down, left or right movement of the remote controller 200.

The speed and direction of the pointer 205 may correspond to the speed and direction of the remote controller 200.

Figure 4B:
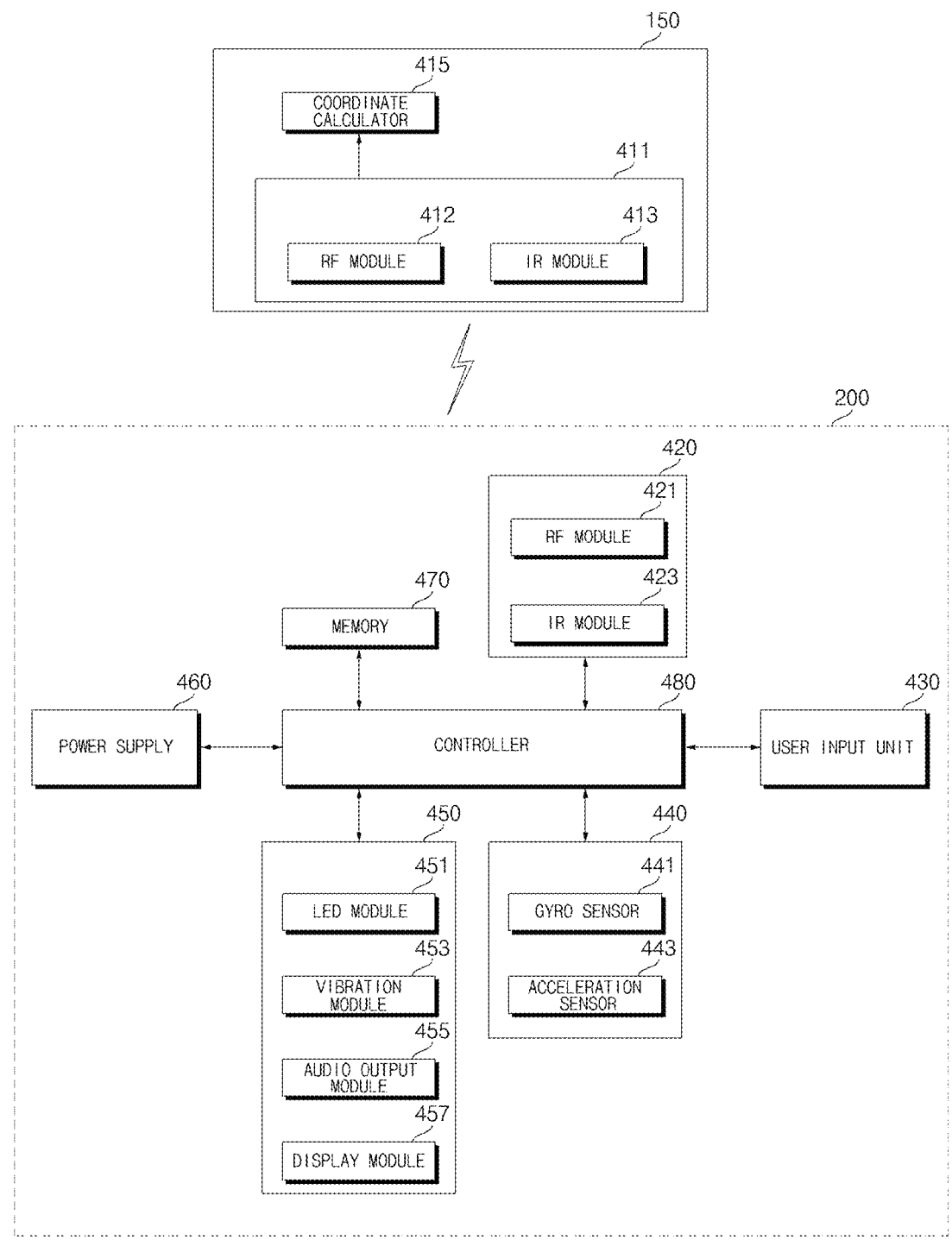
FIG. 4B is a block diagram of a remote controller illustrated in FIG. 2.

FIG. 4B is a block diagram of the remote controller illustrated in FIG. 2.

Referring to FIG. 4B, the remote controller 200 may include a wireless communication unit 425, a user input unit 435, a sensor unit 440, an output unit 450, a power supply 460, a memory 470, and a signal processor 480.

The wireless communication unit 425 transmits signals to and/or receives signals from one of image display apparatuses according to embodiments of the present disclosure. One of the image display apparatuses according to embodiments of the present disclosure, that is, the image display apparatus 100 will be taken as an example.

In this embodiment, the remote controller 200 may include an RF module 421 for transmitting RF signals to and/or receiving RF signals from the image display apparatus 100 according to an RF communication standard. Further, the remote controller 200 may include an IR module 423 for transmitting IR signals to and/or receiving IR signals from the image display apparatus 100 according to an IR communication standard.

In this embodiment, the remote controller 200 may transmit a signal carrying information about movement of the remote controller 200 to the image display apparatus 100 through the RF module 421.

Further, the remote controller 200 may receive signals from the image display apparatus 100 through the RF module 421. The remote controller 200 may transmit commands, such as a power on/off command, a channel switching command, or a sound volume change command, to the image display apparatus 100 through the IR module 423, as needed.

The user input unit 435 may include a keypad, a plurality of buttons, a touch pad, or a touch screen. The user may enter commands to the image display apparatus 100 by manipulating the user input unit 435. If the user input unit 435 includes a plurality of hard-key buttons, the user may input various commands to the image display apparatus 100 by pressing the hard-key buttons. If the user input unit 435 includes a touch screen displaying a plurality of soft keys, the user may input various commands to the image display apparatus 100 by touching the soft keys. The user input unit 435 may also include various input tools other than those set forth herein, such as a scroll key and/or a jog key, which should not be construed as limiting the present disclosure.

The sensor unit 440 may include a gyro sensor 441 and/or an acceleration sensor 443. The gyro sensor 441 may sense the movement of the remote controller 200.

For example, the gyro sensor 441 may sense motion information about the remote controller 200 in X-, Y-, and Z-axis directions. The acceleration sensor 443 may sense the moving speed of the remote controller 200. The sensor unit 440 may further include a distance sensor for sensing the distance between the remote controller 200 and the display 180.

The output unit 450 may output a video and/or audio signal corresponding to a manipulation of the user input unit 435 or a signal transmitted by the image display apparatus 100. The user may easily identify whether the user input unit 435 has been manipulated or whether the image display apparatus 100 has been controlled based on the video and/or audio signal output from the output unit 450.

For example, the output unit 450 may include an LED module 451 which is turned on or off whenever the user input unit 435 is manipulated or whenever a signal is received from or transmitted to the image display apparatus 100 through the wireless communication unit 425, a vibration module 453 which generates vibrations, an audio output module 455 which outputs audio data, or a display module 457 which outputs an image.

The power supply 460 supplies power to the remote controller 200. If the remote controller 200 is kept stationary for a predetermined time or longer, the power supply 460 may, for example, cut off supply of power to the remote controller 200 in order to save power. The power supply 460 may resume supply of power if a specific key on the remote controller 200 is manipulated.

The memory 470 may store various programs and application data for controlling or operating the remote controller 200. The remote controller 200 may wirelessly transmit signals to and/or receive signals from the image display apparatus 100 in a predetermined frequency band through the RF module 421. The signal processor 480 of the remote controller 200 may store information regarding the frequency band used for the remote controller 200 to wirelessly transmit signals to and/or wirelessly receive signals from the paired image display apparatus 100 in the memory 470 and may then refer to this information for use at a later time.

The signal processor 480 provides overall control to the remote controller 200. For example, the signal processor 480 may transmit a signal corresponding to a key manipulation detected from the user input unit 435 or a signal corresponding to motion of the remote controller 200, as sensed by the sensor unit 440, to the image display apparatus 100 through the wireless communication unit 425.

The user input interface 150 of the image display apparatus 100 may include a wireless communication module 411 which wirelessly transmits signals to and/or wirelessly receives signals from the remote controller 200, and a coordinate calculator 415 which calculates coordinates representing the position of the remote controller 200 on the display screen, which is to be moved in accordance with the movement of the remote controller 200.

The user input interface 150 may wirelessly transmit RF signals to and/or wirelessly receive RF signals from the remote controller 200 through an RF module 412. In addition, the user input interface 150 may wirelessly receive IR signals from the remote controller 200 through an IR module 413 according to the IR communication standard.

The coordinate calculator 415 may receive motion information regarding the movement of the remote controller 200 through the wireless communication module 411 and may calculate coordinates (x, y) representing the position of the pointer 205 on a screen of the display 180 by correcting the motion information for possible errors or user hand tremor.

A signal received in the image display apparatus 100 from the remote controller 200 through the user input interface 150 may be transmitted to the signal processor 170. Then, the signal processor 170 may acquire information regarding the movement of the remote controller 200 and information regarding a key manipulation detected from the remote controller 200 from the signal received from the remote controller 200, and may control the image display apparatus 100 based on the acquired information.

In another example, the remote controller 200 may calculate the coordinates of a position to which the pointer is to be shifted in correspondence with its movement and output the coordinates to the user input interface 150 of the image display apparatus 100. In this case, the user input interface 150 may transmit information about the pointer coordinates which was not corrected for possible errors or user hand tremor to the signal processor 170.

In a further example, unlike the configuration of the remote controller 200 illustrated in FIG. 17B, the coordinate calculator 415 may reside in the signal processor 170, instead of the user input interface 150.

Figure 5:
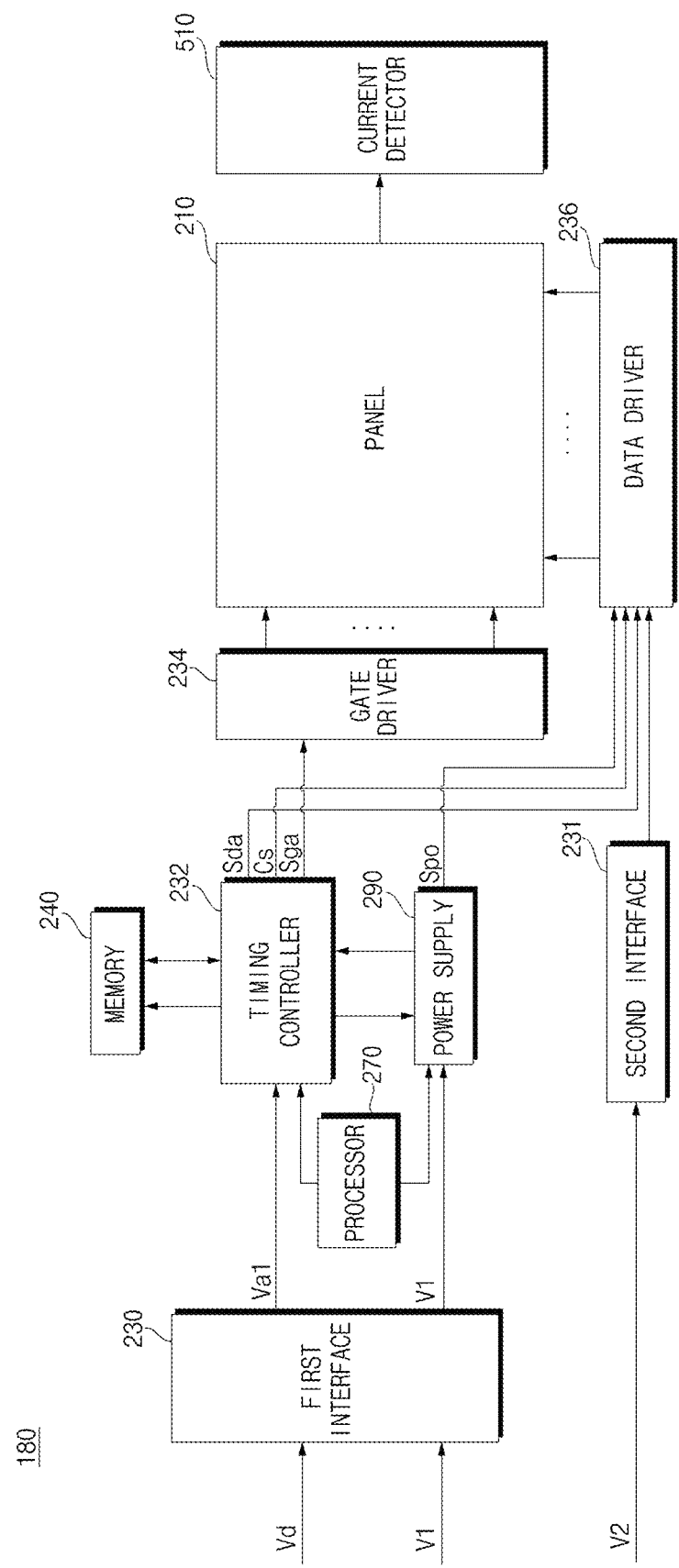
FIG. 5 is a block diagram of a display shown in FIG. 2.

FIG. 5 is a block diagram of the display shown in FIG. 2.

Referring to the drawing, an organic light emitting panel-based display 180 may include an organic light emitting display 210, a first interface 230, a second interface 231, a timing controller 232, a gate driver 234, a data driver 236, a memory 240, a processor 270, a power supply 290, a current detector 510, etc.

The display 180 may receive an image signal Vd, a first DC power V1, and a second DC power V2, and display a specific image based on an image signal.

Meanwhile, the first interface 230 of the display 180 may receive the image signal Vd and the first DC power V1 from the signal processor 170.

The first DC power V1 may be used to operate the power supply 290 and the timing controller 230 in the display 180.

The second interface 231 may receive the second DC power V2 from an external power supply 190.

The timing controller 232 may output a data driving signal Sda and a gate driving signal Sga based on the image signal Vd.

For example, when the first interface 230 outputs a converted image signal va1 by converting the received image signal Vd, the timing controller 232 may output the data driving signal Sda and the gate driving signal Sga based on the converted image signal va1.

The timing controller 232 may further receive a control signal and a vertical synchronization signal in addition to the image signal vd from the signal processor 170.

In addition, the timing controller 232 may output a gate driving signal Sga for operating the gate driver 234 and a data driving signal Sda for operating the data driver 236, based on the control signal and the vertical synchronization signal Vsync in addition to the image signal Vd.

In the case where the panel 210 includes RGBW subpixels, the data driving signal Sda may be a data driving signal for operating the RGBW subpixels.

Meanwhile, the timing controller 232 may further output a control signal Cs to the gate driver 234.

In accordance with the gate driving signal Sga and the data driving signal Sda from the timing controller 232, the gate driver 234 and the data driver 236 supply a scan signal and an image signal through gate lines GL and data lines DL, respectively. Accordingly, the organic light emitting panel 210 displays the specific image.

Meanwhile, the organic light emitting panel 210 may include an organic light emitting layer, and a plurality of gate lines GL and a plurality of data lines DL may cross each other in a matrix form at each pixel corresponding to the organic light emitting layer.

Meanwhile, the data driver 236 may output a data signal to the organic light emitting panel 210 based on the second DC power V2 from the second interface 231.

The power supply 290 may supply various types of power to the gate driver 234, the data driver 236, the timing controller 232, etc.

The current detector 510 may detect a current flowing in a subpixel of the organic light emitting panel 210. The detected current may be input to the processor 270 or the like to calculate accumulated currents.

The processor 270 may perform various control operations in the display 180. For example, the processor 270 may control the gate driver 234, the data driver 236, the timing controller 232, etc.

Meanwhile, the processor 270 may receive information on a current flowing in a subpixel of the organic light emitting panel 210 from the current detector 510.

In addition, the processor 270 may calculate accumulates currents in a subpixel of the organic light emitting panel 210 based on the information on a current flowing in the subpixel of the organic light emitting panel 210. The calculated value of the accumulated currents may be stored in the memory 240.

Meanwhile, when accumulated currents in a subpixel of the organic light emitting panel 210 is greater than a threshold level, the processor 270 may determine that the subpixel burns-in.

For example, when accumulated currents in a subpixel of the organic light emitting panel 210 is equal to or greater than 300000 A, the processor 270 may determine that the subpixel burns-in.

Meanwhile, when accumulated currents in some of subpixels of the organic light emitting panel 210 is close to a threshold level, the processor 270 may determine that the corresponding subpixels are burn-in expected subpixels.

Meanwhile, based on a current detected by the current detector 510, the processor 270 may determine that a subpixel having the greatest accumulated currents is a burn-in expected subpixel.

Figure 6A:
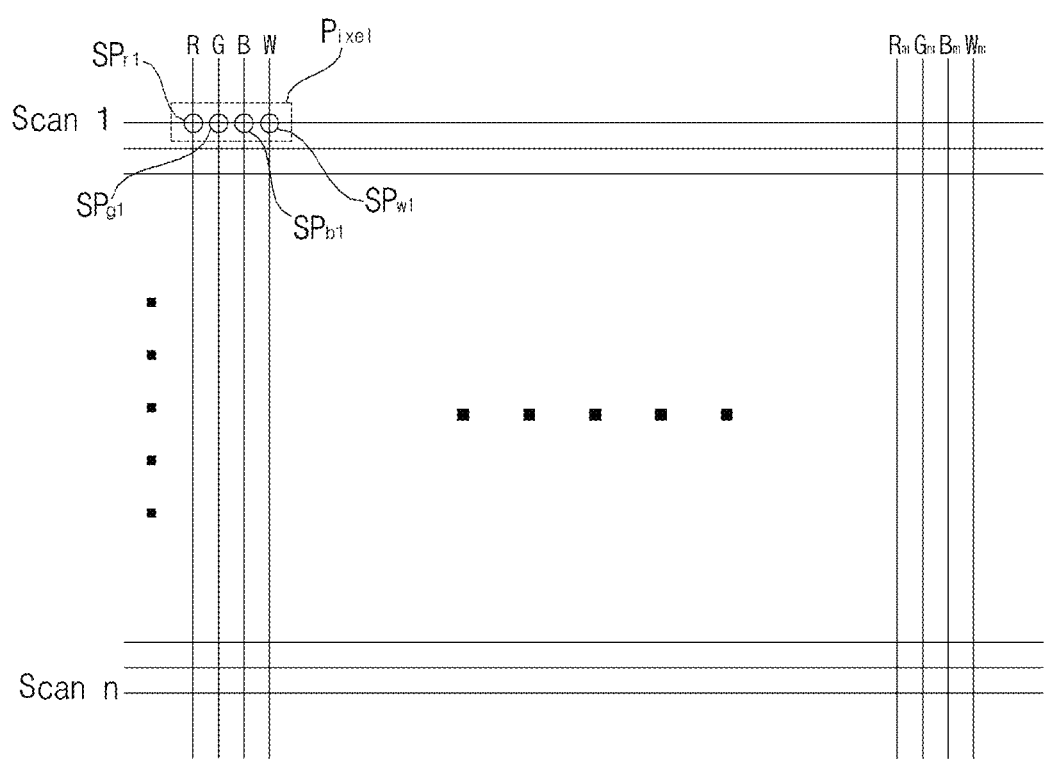
FIGS. 6A and 6B are diagrams referred to for describing an organic light emitting display panel shown in FIG. 5.
Figure 6B:
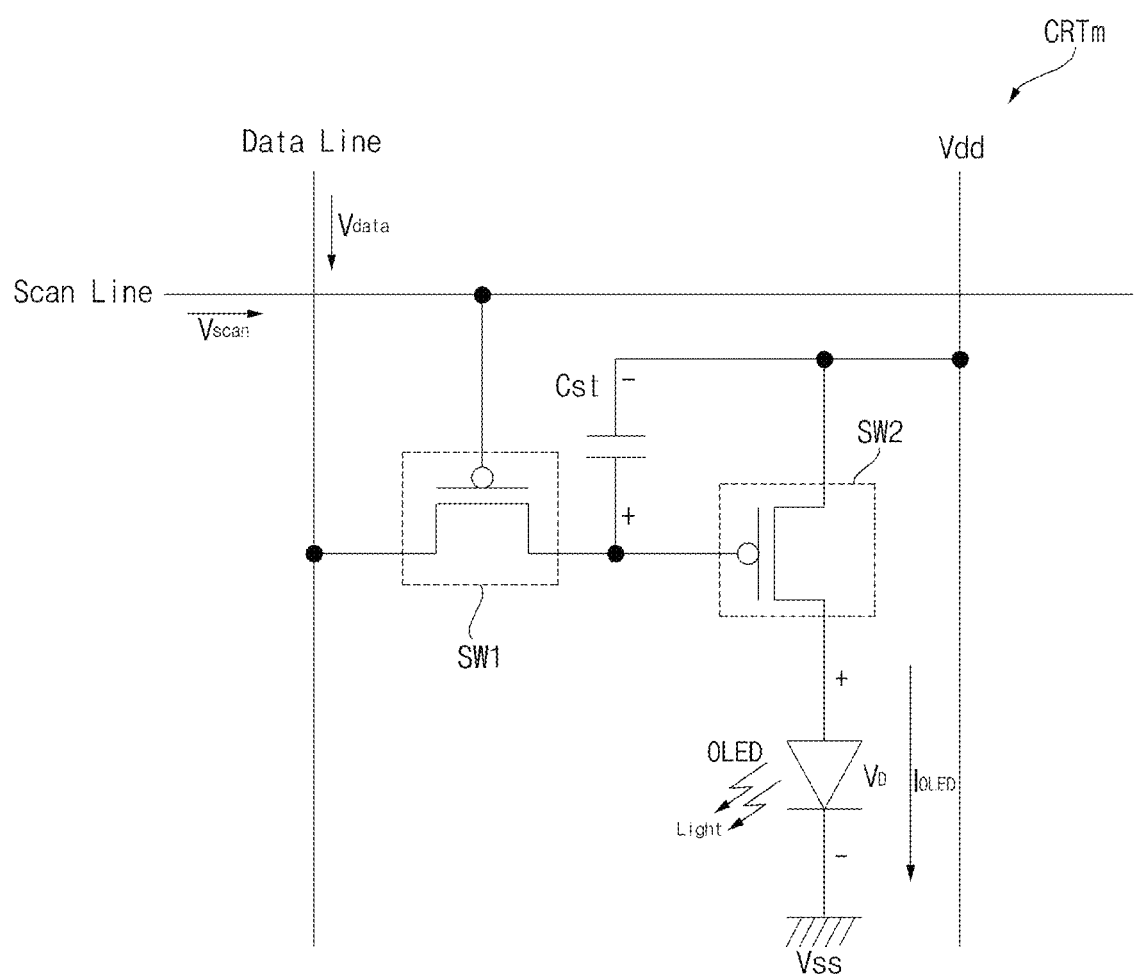

FIGS. 6A and 6B are diagrams referred to for describing the organic light emitting display panel shown in FIG. 5.

First, FIG. 6A is a diagram illustrating a pixel in the organic light emitting panel 210.

Referring to the drawings, the organic light emitting panel 210 may have a plurality of scan lines Scan 1 to Scan n, and a plurality of data lines R1,G1,B1,W1~Rm,Gm,Bm,Wm intersecting therewith.

Meanwhile, a pixel is defined in an area where scan lines and data lines are intersecting with each other in the organic light emitting panel 210. In the drawing, a pixel Pixel 1 having RGBW subpixels SR1, SG1, SB1, and SW1 is illustrated.

FIG. 6B illustrates a circuit of any one subpixel in a pixel of the organic light emitting panel shown in FIG. 6A.

Referring to the drawing, a circuit CRTm of an organic light emitting subpixel may be an active type and include a scan switching device SW1, a storage capacitor Cst, a drive switching device SW2, and an organic light emitting layer OLED.

The scan switching device SW1 is connected to a scan line at a gate terminal, so that the scan switching device SW1 is turned on by a received scan signal Vdscan. When turned on, the scan switching device SW1 transfers a received data signal Vdata to a gate terminal of the drive switching device SW2 or one end of the storage capacitor Cst.

The storage capacitor Cst is formed between a gate terminal and a source terminal of the drive switching device SW2, and stores a specific difference between a level of a data signal transferred to one end of the storage capacitor Cst and a level of DC power VDD transferred to the other end of the storage capacitor Cst.

In one example, if data signals have different levels according to a Pulse Amplitude Modulation (PAM) method, a different power level is stored in the storage capacitor Cst due to the level difference of the data signal Vdata.

In another example, if a data signal has a different pulse width according to a Pulse Width Modulation (PWM) method, a different power level is stored in the storage capacitor Cst due to a pulse width difference of the data signal Vdata.

The drive switching device SW2 is turned on by a power level stored in the storage capacitor Cst. When the drive switching device SW2 is turned on, a driving current (IOLED) proportional to the stored power level flows in the organic light emitting layer (OLED). Accordingly, the organic light emitting layer OLED emits light.

The organic light emitting layer (OLED) may include an RGBW light emitting layer EML corresponding to subpixels, include at least one of a hole injection layer (HIL), a hole transport layer (HTL), an electron transport layer (ETL), or an electron injection layer (EIL), and may additionally include a hole blocking layer (HBL).

Meanwhile, while subpixels emit white light in the organic light emitting layer OLED, green, red, and blue subpixels have additional color filters to realize colors. That is, the green, red, and blue subpixels further have green, red, and blue color filters, respectively. Meanwhile, a while subpixel outputs white light and thus does not need an additional color filter.

Meanwhile, the drawing shows the case where the scan switching device SW1 and the drive switching device SW2 are p-type MOSFETs, but the scan switching device SW1 and the drive switching device SW2 may be n-type MOSFETs or any other switching devices, such as JFET, IGBT, or SIC.

A pixel is a hold-type device which, after a scan signal is applied, keeps emitting light in the organic light emitting layer OLED during a unit display period, specifically, during a unit frame.

Meanwhile, in the case where the image display apparatus 100 has the organic light emitting panel 210, if an image displayed on the organic light emitting panel 210 becomes brighter, power consumption increases because the organic light emitting panel 210 is a self-emitting device.

To prevent the power consumption from increasing, a technique for reducing power consumption when displaying a bright image on the organic light emitting panel 210 has been adopted. Due to use of this technique, the peak luminance of a bright image is reduced and this deteriorates the 3D effect.

In order to compensate for reduction in a peak luminance and a deteriorated 3D effect of an image on the organic light emitting panel 210, the present disclosure proposes a method of artificial-intelligently analyze an object in a received image signal and enhancing the 3D effect of the object.

With the development of camera and broadcasting technologies, resolution and a vertical synchronization frequency of a received image signal have improved. In particular, there is a need of performing image quality processing based on an image signal having resolution of 4K and a vertical synchronization frequency of 120 Hz. Accordingly, a method for enhancing image quality of a received image signal is proposed. A decryption thereof will be provided after FIG. 7.

Figure 7:
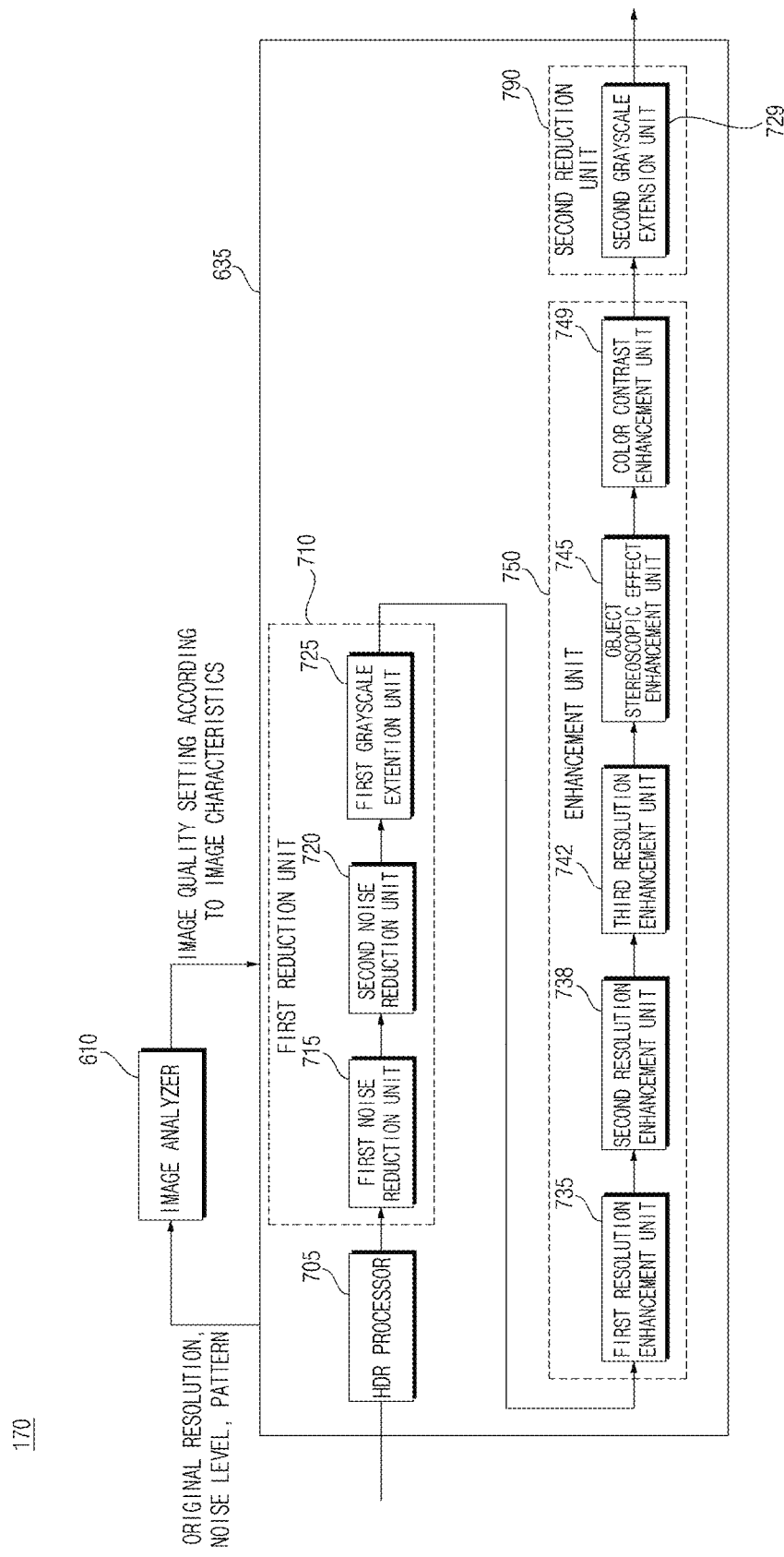
FIG. 7 is an example of a block diagram of a signal processing device according to an embodiment of the present disclosure.

FIG. 7 is an example of a block diagram of a signal processing device according to an embodiment of the present disclosure, and FIGS. 8A to 17 are diagrams referred to for describing operation of the signal processing device shown in FIG. 7.

Meanwhile, a signal processing device 170 shown in FIG. 7 may correspond to the signal processor 170 shown in FIG. 2.

First, referring to FIG. 7, the signal processing device 170 according to an embodiment of the present disclosure may include an image analyzer 610 and an image quality processor 635.

The image analyzer 610 may analyze a received image signal and output information regarding the analyzed image signal.

Meanwhile, the image analyzer 610 may separate an object area and a background area of a first received image signal. Alternatively, the image analyzer 610 may calculate a probability or a proportion of an object area and a background area of the first received image signal.

A received image signal may be a received image signal from the image receiver 105, or a video decoded by the video decoder 325 shown in FIG. 3.

In particular, using artificial intelligence (AI), the image analyzer 610 may analyze a received image signal and output information on the analyzed image signal.

Specifically, the image analyzer 610 may analyze resolution, grayscale, a noise level, and pattern of a received image signal, and output information regarding the analyzed image signal, especially video quality setting information, to the image quality processor 635.

The image quality processor 635 may include an HDR processor 705, a first reduction unit 710, an enhancement unit 750, and a second reduction unit 790.

The HDR processor 705 may receive an image signal and perform High Dynamic Range (RDR) processing based on the received image signal.

For example, the HDR processor 705 may convert a Standard Dynamic Range (SDR) image signal into an HDR image signal.

In another example, the HDR processor 705 may receive an image signal and perform grayscale processing based on the received image signal for HDR.

Meanwhile, when a received image signal is an SDR image signal, the HDR processor 705 may bypass grayscale conversion. When a received image signal is an HDR image signal, the HDR processor 705 may perform grayscale conversion. Accordingly, expression of high grayscale of a received image may improve.

Meanwhile, the HDR processor 705 may perform grayscale conversion based on a first grayscale conversion mode in which low grayscale is highlighted compared to high grayscale and the high grayscale is saturated, and a second grayscale conversion mode in which the low grayscale and the high grayscale are converted somewhat uniformly.

Figure 8A:
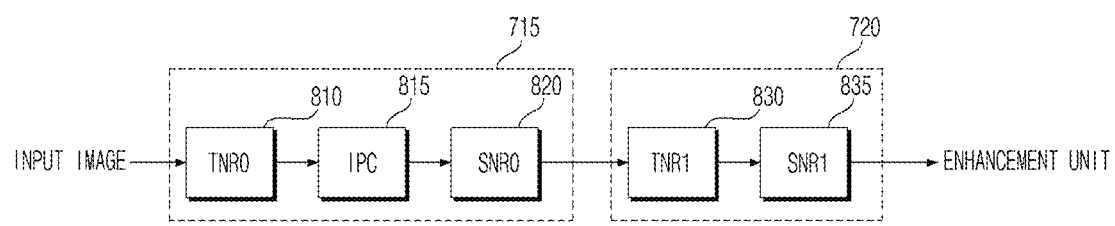
Figure 8B:
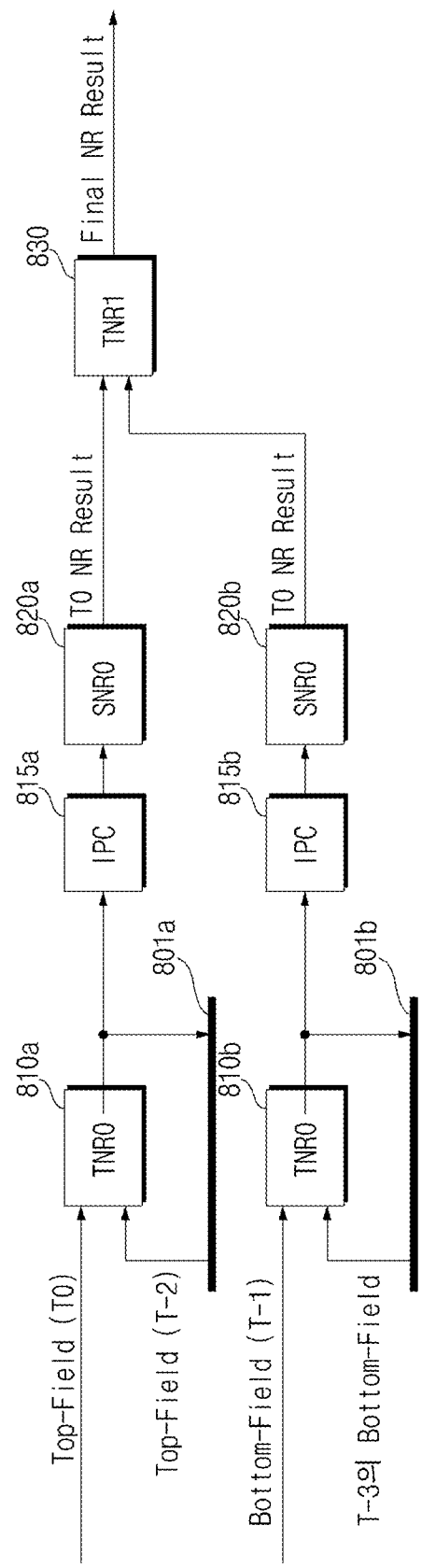
Figure 8C:
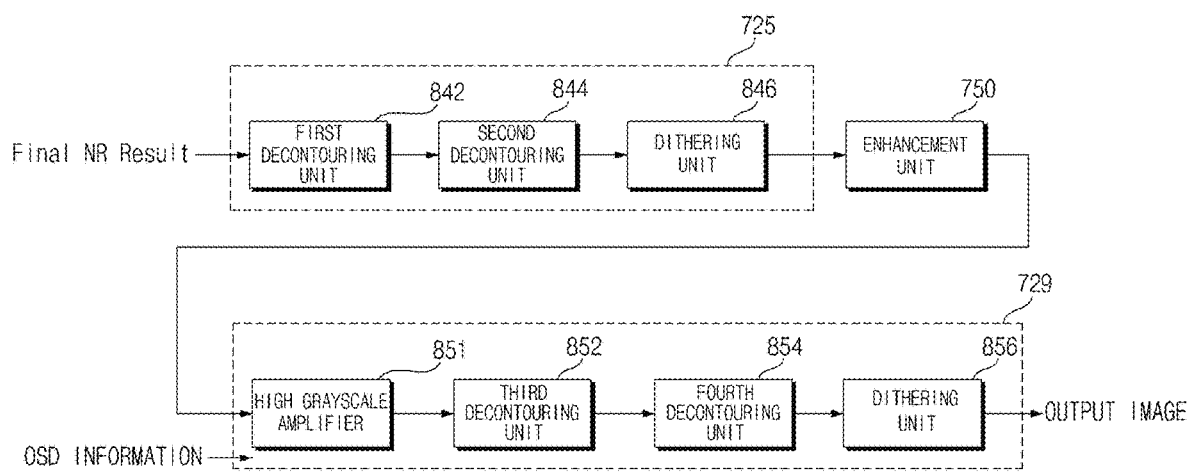
Figure 8D:
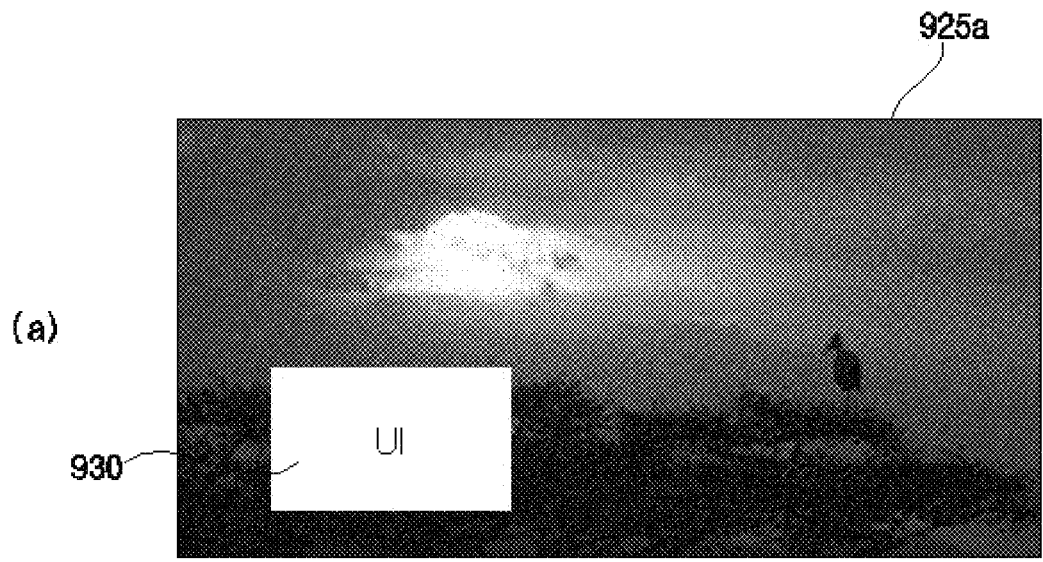
Figure 8D:
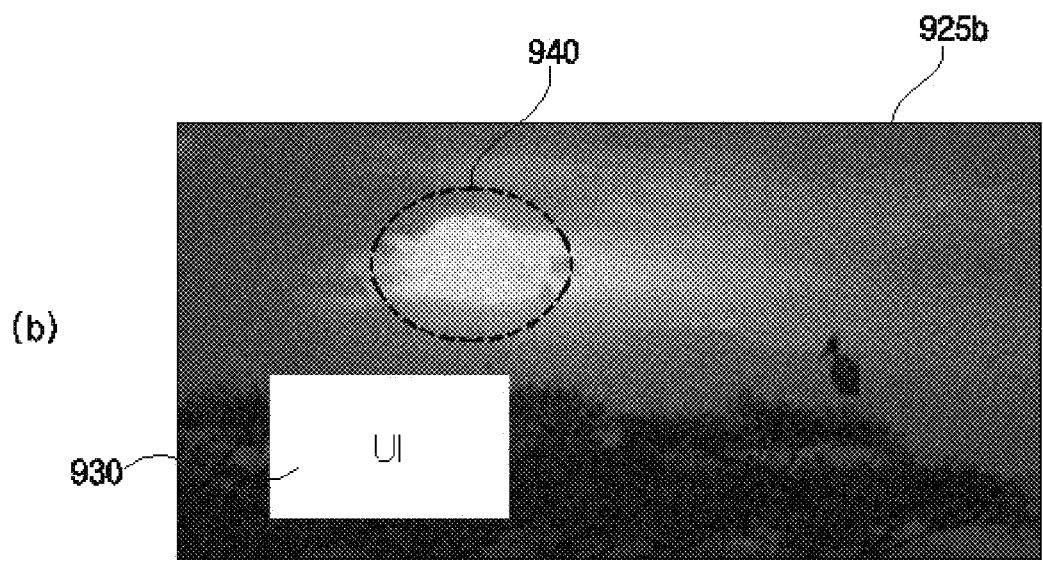
Figure 8E:
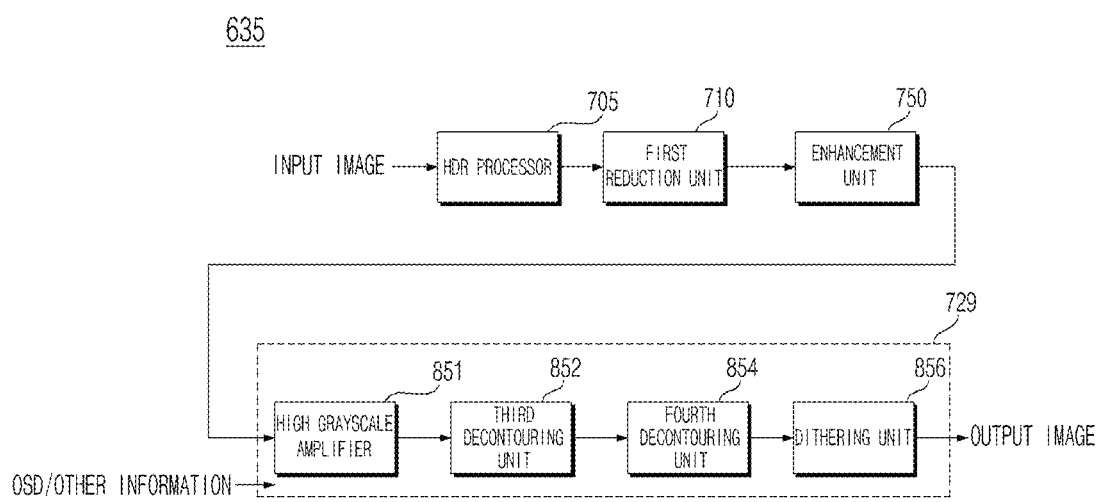
Figure 8F:
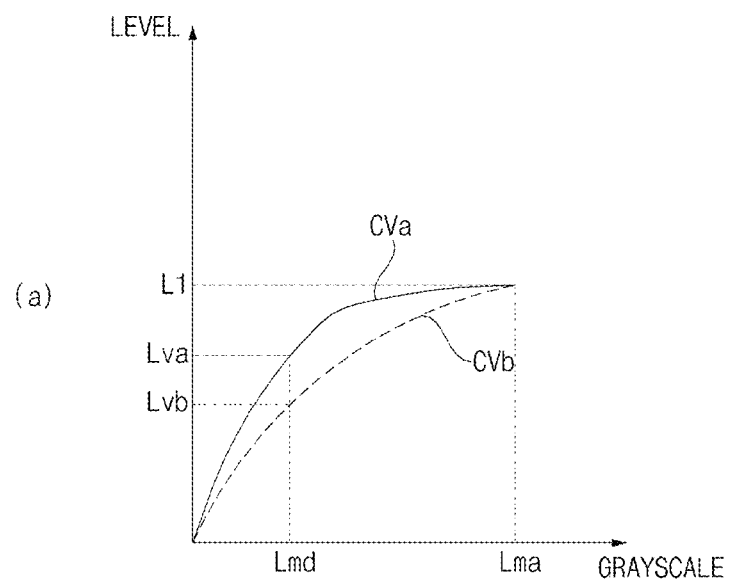
Figure 8F:
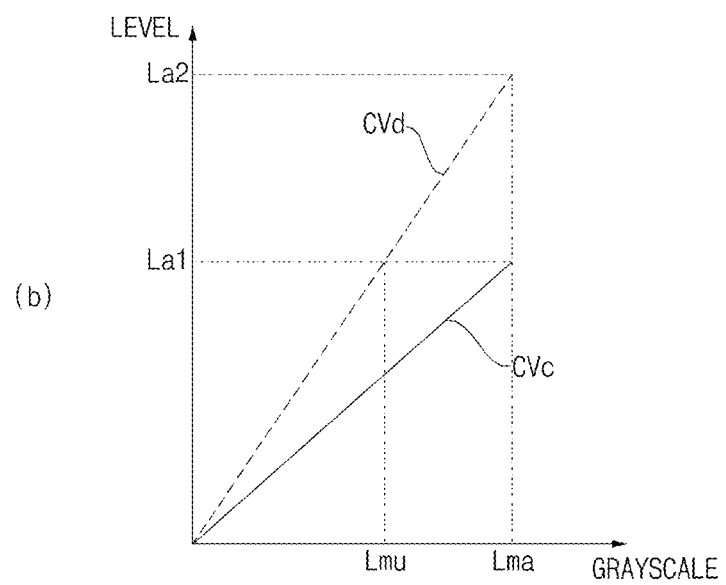

For example, in (a) of FIG. 8F, a first grayscale conversion curve CVa corresponding to the first grayscale conversion mode and a second grayscale conversion curve CVb corresponding to the second grayscale conversion mode are exemplarily illustrated.

The HDR processor 705 may perform grayscale conversion based on the first grayscale conversion curve CVa or the second grayscale conversion curve CVb.

For example, the HDR processor 705 may perform grayscale conversion based on data in a lookup table corresponding to the first grayscale conversion curve CVa or data in a lookup table corresponding to the second grayscale conversion curve CVb.

Specially, when the first grayscale conversion mode is performed, the HDR processor 705 may perform grayscale conversion based on data in the lookup table corresponding to the first grayscale conversion mode.

More specially, in the case where the first grayscale conversion mode is performed, the HDR processor 705 may perform grayscale conversion based on an arithmetic expression related to input data and data in the lookup table corresponding to the first grayscale conversion mode determined according to the arithmetic expression. Here, the input data may include video data and meta data.

Meanwhile, when the second grayscale conversion mode is performed, the HDR processor 705 may perform grayscale conversion based on data in the lookup table corresponding to the second grayscale conversion mode.

More specifically, in the case where the second grayscale conversion mode is performed, the HDR processor 705 may perform grayscale conversion based on an arithmetic expression related to input data and data in a lookup table corresponding to a second grayscale conversion mode determined according to the above arithmetic expression. Here, the input data may include video data and meta data.

Meanwhile, the HDR processor 705 may select the first grayscale conversion mode or the second grayscale conversion mode according to a third grayscale conversion mode or a fourth grayscale conversion mode in a high-grayscale amplifier 851 of the second reduction unit 790.

In (b) of FIG. 8F, a third grayscale conversion curve CVc corresponding to the third grayscale conversion mode and a fourth grayscale conversion curve CVd corresponding to the fourth grayscale conversion mode are exemplarily illustrated.

For example, when the third grayscale conversion mode is performed, the high-grayscale amplifier 851 in the second reduction unit 790 may perform gray level conversion based on data in the lookup table corresponding to the third grayscale conversion mode.

Specially, when the third grayscale conversion mode is performed, the high-grayscale amplifier 851 in the second reduction unit 790 may perform grayscale conversion based on an arithmetic expression related to input data and data in a lookup table corresponding to a third grayscale conversion mode determined according to the above arithmetic expression. Here, the input data may include video data and meta data.

Meanwhile, in the case where the fourth grayscale conversion mode is performed, the high gradation level amplifier 851 in the second reduction unit 790 may perform grayscale conversion based on data in the lookup table corresponding to the fourth grayscale conversion mode.

Specifically, in the case where the fourth grayscale conversion mode is performed, the high-grayscale amplifier 851 in the second reduction unit 790 may perform grayscale conversion based on an arithmetic expression related to input data and data in a lookup table corresponding to a forth grayscale conversion mode determined according to the above arithmetic expression. Here, the input data may include video data and meta data.

In one example, when the fourth grayscale conversion mode is implemented in the high grayscale amplifier 851 of the second reduction unit 790, the HDR processor 705 may implement the second grayscale conversion mode.

In another example, when the third grayscale conversion mode is implemented in the high-grayscale amplifier 851 of the second reduction unit 790, the HDR processor 705 may implement the first grayscale conversion mode.

Alternatively, the high-grayscale amplifier 851 of the second reduction unit 790 may change a grayscale conversion mode to be implemented, according to a grayscale conversion mode implemented in the HDR processor 705.

In one example, when the second grayscale conversion mode is implemented in the HDR processor 705, the high-grayscale amplifier 851 of the second reduction unit 790 may implement the fourth grayscale conversion mode.

In another example, when the first grayscale conversion mode is implemented in the HDR processor 705, the high grayscale amplifier 851 of the second reduction unit 790 may implement the third grayscale conversion mode.

Meanwhile, the HDR processor 705 according to an embodiment of the present disclosure may implement a grayscale conversion mode so that low grayscales and high grayscales are converted uniformly.

That is, the HDR processor 705 may perform grayscale conversion based on the second grayscale conversion curve CVb rather than the first grayscale conversion curve CVa.

Meanwhile, the second reduction unit 790 may implement the fourth grayscale conversion mode according to the second grayscale conversion mode implemented in the HDR processor 705, and thus amplify the upper-limit level of grayscale of a received image signal. Accordingly, expression of high grayscale of a received image may improve.

Next, the first reduction unit 710 may reduce noise of the received image signal or an image signal processed by the HDR processor 705.

Specifically, the first reduction unit 710 may perform multi-stage noise reduction and first-stage grayscale extension processing based on a received image signal or an HDR image received from the HDR processor 705.

To this end, the first reduction unit 710 may include a plurality of noise reduction units 715 and 720 for multi-stage noise reduction, and a grayscale extension unit 725 for grayscale extension.

Next, the enhancement unit 750 may perform multi-stage resolution enhancement based on an image received from the first reduction unit 710.

In addition, the enhancement unit 750 may perform object stereoscopic effect enhancement. Further, the enhancement unit 750 may perform color or contrast enhancement.

To this end, the enhancement unit 750 may include a plurality of resolution enhancement units 735, 738, and 742 for multi-stage resolution enhancement, an object stereoscopic effect enhancement unit 745 for enhancement of a stereoscopic effect of an object, and a color contrast enhancement unit 749 for color or contrast enhancement.

Next, the second reduction unit 790 may perform second-stage grayscale extension processing based on a noise-reduced image signal received from the first reduction unit 710.

Meanwhile, the second reduction unit 790 may amplify the upper-limit level of grayscale of a received signal and extend the grayscale of the received signal.

Accordingly, expression of high grayscale of a received image may improve.

For example, it is possible to uniformly extend entire grayscale of a received signal. Accordingly, as uniform grayscale extension is performed on an area of a received image, expression of high grayscale may improve.

Meanwhile, the second reduction unit 790 may perform grayscale amplification and grayscale extension based on a received signal from the first grayscale extension unit 725. Accordingly, expression of high grayscale of a received image may improve.

Meanwhile, when a received image signal is an SDR image signal, the second reduction unit 790 may change a degree of amplification based on a user input signal. Accordingly, expression of high grayscale may improve in response to a user's setting.

Meanwhile, when a received image signal is an HDR image signal, the second reduction unit 790 may perform amplification according to a set value. Accordingly, expression of high grayscale of a received image may improve.

Meanwhile, when a received image signal is an HDR image signal, the second reduction unit 790 may change a degree of amplification based on a user input signal. Accordingly, expression of high grayscale may improve in response to a user's setting.

Meanwhile, when extending a grayscale, the second reduction unit 790 may change a degree of extending the grayscale based on a user input signal. Accordingly, expression of high grayscale may improve in response to a user's setting.

Meanwhile, the second reduction unit 790 may amplify the upper-limit level of grayscale according to a grayscale conversion mode implemented in the HDR processor 705. Accordingly, expression of high grayscale of a received image may improve.

The signal processing device 170 may include an HDR processor 705 which receives an image signal and adjusts a luminance of the image signal, and a reduction unit 790 which amplifies the adjusted luminance of the image signal and increases a resolution of the grayscale of the image signal to generate an enhanced image signal. Here, the enhanced image signal provides an increased luminance and grayscale resolution of the image signal while maintaining high dynamic range within the displayed HDR image.

Meanwhile, the luminance range of the image signal is adjusted according to a control signal received at the signal processor 170.

The signal processing device 170 may further include an image analyzer.

The image processing apparatus further includes an image analyzer 610 for determining whether the received image signal is an HDR signal or standard dynamic range (SDR) signal, and for generating the control signal for providing to the HDR processor 705. Here, the luminance of the image signal is adjusted only when the control signal indicates that the received image signal is an HDR signal.

Meanwhile, the control signal is received from the controller 170 of the image display apparatus 100 associated with the signal processing, and corresponds to the setting of the image display apparatus 100.

Meanwhile, the resolution of the grayscale is increased based on the amplification of the adjusted luminance of the image signal.

Meanwhile, the resolution of the grayscale is increased based on the control signal received at the image display apparatus 100.

Meanwhile, the reduction unit 790 may includes a high-grayscale amplifier 851 for amplifying the upper-limit level of the grayscale of the received signal, and a decontouring unit 842, 844 for expanding increase the resolution of the grayscale amplified by the high grayscale amplifier.

The second reduction unit 790 may include a second grayscale extension unit 729 for second-stage grayscale extension.

Meanwhile, the image quality processor 635 of the signal processing device 170 of the present disclosure is characterized by performing four-stage reduction processing and four-stage image enhancement processing, as shown in FIG. 7.

The four-stage reduction processing may include a two-stage noise reduction and a two-stage grayscale extension.

The two-stage noise reduction may be performed by the first and second noise reduction units 715 and 720 in the first reduction unit 710. The two-stage grayscale extension may be performed by the first grayscale extension unit 725 in the first reduction unit 710 and the second grayscale extension unit 729 in the second reduction unit 790.

Meanwhile, the four-stage image enhancement processing may include three-stage resolution enhancement (bit resolution enhancement), and object stereoscopic effect enhancement.

The three-stage resolution enhancement may be performed by the first to third resolution enhancement units 735, 738, and 742. The object stereoscopic effect enhancement may be performed by the object stereoscopic effect enhancement unit 745.

Meanwhile, a first characteristic of the signal processing device 170 of the present disclosure lies in gradually enhancing image quality by applying an identical or similar algorithm multiple times for multi-stage image quality processing.

To this end, the image quality processor 635 in the signal processing device 170 of the present disclosure performs video quality processing by applying an identical or similar algorithm two times or more.

Meanwhile, the identical or similar algorithm employed by the image quality processor 635 has a different purpose in each stage. In addition, compared to performing image quality in a single stage, gradually performing multi-stage image quality processing may cause less artifacts to occur in an image, and generate a more natural and clear image processing result.

Meanwhile, by applying the identical or similar algorithm alternatively with another image quality processing algorithm, it is possible to achieve an effect more than what is expected from simple continuous processing.

Meanwhile, another characteristic of the signal processing device 170 of the present disclosure lies in performing multi-stage noise reduction. Noise reduction in each stage may include temporal processing and spatial processing. It will be described in more detail with reference to FIG. 8A.

FIG. 8A is referred to for describing operation of the first and second noise reduction units 715 and 720 shown in FIG. 7.

Referring to the drawing, the first and second noise reduction units 715 and 720 may perform temporal noise reduction and spatial noise reduction, respectively.

To this end, for first-stage noise reduction, the first noise reduction unit 715 may include a temporal noise reduction unit 810, an IPC unit 815, and a spatial noise reduction unit 820.

For second-stage noise reduction, the second noise reduction unit 720 may include a temporal noise reduction unit 830 and a spatial noise reduction unit 835.

The temporal noise reduction units 810 and 830 may reduce noise by comparing previous data and current data. The spatial noise reduction units 820 and 835 may reduce noise by comparing image data included in the current data and surrounding image data.

Data used by the temporal noise reduction units 810 and 830 and the spatial noise reduction units 820 and 835 may be frame data or field data.

Meanwhile, the first noise reduction unit 715 may reduce noise of original data of a received input image signal.

The second noise reduction unit 720 may remove flicker which occurs between frames of the received input image signal or which occurs after noise reduction by the first noise reduction unit 715.

Meanwhile, the IPC unit 815 may be positioned between the temporal noise reduction unit 810 and the spatial noise reduction unit 820, and perform interlaced progressive conversion.

The IPC unit 815 may convert an interlaced image signal into a progressive image signal especially when a received image signal is an interlaced video. The IPC unit 815 will be described in more detail with reference to FIG. 8B.

FIG. 8B is a diagram referred to for describing multi-stage noise reduction when an input video is an interlaced video.

Referring to the drawing, a top field of the interlaced image may be processed at a first time point and a bottom field of the interlaced video may be processed at a second time point.

Specifically, when a received image signal is an interlaced video, a temporal noise reduction unit 810*a* may perform, at a first time point, temporal noise reduction using current data To in a top field and previous data T-2 which is temporal-noise reduced and then stored in a memory 801*a*.

In addition, the IPC unit 815*a* may perform interlaced progressive conversion by combining image data in a top field, which is temporal-noise reduced by the temporal noise reduction unit 810*a*, and image data of a previous top field stored in the memory 801*a*, which is noise reduced.

That is, the IPC unit 815*a* may output a top field-based frame image data on the basis of image data of a top field, which is temporal-noise reduced by the temporal noise reduction unit 810*a*.

In addition, the spatial noise reduction unit 820*a* may perform spatial noise reduction based on a top field-based frame image data generated by the IPC unit 815*a*.

Next, when the received image signal represents an interlaced image, a temporal noise reduction unit 810*b* may perform temporal noise reduction at a second time point using the current data (T-1) in a bottom field and previous data (T-3) which is temporal-noise reduced and stored in a memory 801*b*.

In addition, the IPC unit 815*b* may perform interlaced progressive conversion by combining image data in a bottom field, which is temporal-noise reduced by the temporal noise reduction unit 810*b*, and image data in a previous bottom field, which is noise reduced and stored in the memory 801*b*.

That is, the IPC unit 815*b* may output bottom field-based frame image data on the basis of image data in a bottom field, which is temporal-noise reduced by the temporal noise reduction unit 810*b*.

In addition, the spatial noise reduction unit 820*b* may perform spatial noise reduction based on bottom field-based frame image data which is generated by the IPC unit 815*b*.

The second-stage temporal noise reduction unit 830 may perform temporal noise reduction based on top field-based frame video data processed by the temporal noise reduction unit 820*a* and bottom field-based frame video data processed by the spatial noise reduction unit 820*b*.

The second-stage temporal noise reduction unit 830 may process the top field-based frame video data and the bottom field-based frame video data together, thereby enabled to remove flicker between the top field and the bottom field, the flicker which has not processed in a previous stage. In conclusion, it is possible to remove artifacts occurring in the interlaced image.

Meanwhile, another characteristic of the signal processing device 170 of the present disclosure lies in performing grayscale reproduction or grayscale extension in multiple stages.

Grayscale of a received image signal may mean bit resolution, and represent respective channels of R, G, B or Y, Cb, Cr.

Meanwhile, the number of bits of image grayscale processed in the signal processing device 170 may be 10 bits or more.

Meanwhile, when original data of a received image signal is 10-bit or lower grayscale data, the signal processing device 170 may perform grayscale reproduction processing or grayscale extension processing, thereby enabled to generate or maintain 10-bit or higher grayscale data.

To this end, the image quality processor 635 of the present disclosure may perform grayscale extension processing in two or more stages. It will be described in more detail with reference to FIG. 8C.

FIG. 8C is a diagram referred to for describing grayscale extension processing.

Referring to FIG. 8C, the first grayscale extension unit 725, the enhancement unit 750, and the second grayscale extension unit 729 may be used for grayscale extension processing.

The first grayscale extension unit 725 may perform first-stage grayscale extension based on an image signal from the HDR processor 705. That is, the first grayscale extension unit 725 may perform first-stage grayscale extension on a grayscale converted by the HDR processing unit 705.

In particular, for the first-stage grayscale extension, the first grayscale extension unit 725 may include decontouring units 842 and 844 and a dithering unit 846.

Specifically, the first grayscale extension unit 725 may include a first decontouring unit 842 for performing first-stage decontouring, a second decoutouring unit 844 for performing second-stage decontouring, and the dithering unit 846 for performing dithering.

The second grayscale extension unit 729 may include a high grayscale amplifier 851 for high grayscale amplification, a third decontouring unit 852 for performing first-stage decontouring, a fourth decontouring unit 854 for performing second-stage decontouring, and a dithering unit 856 for performing dithering.

The first decontouring unit 842 and the third decontouring unit 852 reproduces grayscale of a received image signal by performing first-stage grayscale extension.

The second decontouring unit 844 may restore a grayscale loss, occurring in an inner process, by performing second-stage grayscale extension.

Meanwhile, the first grayscale extension unit 725 and the second grayscale extension unit 729 may let an inner core to pass through each of the decontouring units 842, 844, 852, and 854 two times or more and gradually increase grayscale at the corresponding core by few bits each time. For example, the first grayscale extension unit 725 may reproduce grayscale of each channel up to 14 bits Meanwhile, the grayscale extended by each of the decontouring units 842, 844, 852, and 854 may be dithered by the dithering units 846 and 856, and therefore, a loss of information may be minimized.

Meanwhile, the high grayscale amplifier 851 may amplify the upper-limit level of grayscale of a received signal. Accordingly, expression of high grayscale of a received image may improve.

Meanwhile, the third and fourth decontouring units 852 and 854 may extend the grayscale amplified by the high grayscale amplifier 851.

Meanwhile, the high grayscale amplifier 851 may perform boosting of a bright area in an image by amplifying expression of grayscale of the bright area.

For example, the high grayscale amplifier 851 may perform boosting of an area with a first luminance in an image by amplifying expression of grayscale of the corresponding area.

The high grayscale amplifier 851 may discover a light source area or a reflected light area of a received image signal and perform amplification on the light source area or the reflected light area so that brightness of the corresponding area exceeds a 10-bit expression range (0-1023).

As such, as a light source area or a reflected light area of a received image signal is discovered and the corresponding area is made brighter, it is possible to amplify information of a high grayscale area, thereby providing an effect similar to an HDR effect.

Meanwhile, the second grayscale extension unit 729 may receive OSD information and perform additional image quality processing based on an OSD area.

In this case, the second grayscale extension unit 729 may not perform high grayscale amplification on the OSD area.

Meanwhile, the high grayscale amplifier 851 may receive an image or OSD information from the enhancement unit 750.

For example, when an image is received from the enhancement unit 750, the high grayscale amplifier 851 may perform high grayscale amplification on the received image. Specifically, the high grayscale amplifier 851 may amplify the upper-limit level of the maximum grayscale.

Meanwhile, when OSD information is received, the high grayscale amplifier 851 may not perform high grayscale amplification on an area corresponding to the OSD information.

In addition, when other information (e.g., subtitle information or logo information) is included in a received image, the high grayscale amplifier 851 may not perform high grayscale amplification on an area corresponding to the information (e.g., subtitle information or logo information).

Accordingly, an OSD area or other information area may be processed, without high grayscale amplification, by the third decontouring unit 852 for performing first-stage decontouring, the fourth decontouring unit 854 for performing second-stage decontouring, and the dithering unit 856 for performing dithering.

FIG. 8D is a diagram referred to for describing the case where high grayscale amplification is not performed on an image having an OSD area.

First, (a) of FIG. 9D illustrates an example in which an entire image 925*a* including a user interface (UI) 930 is subject to high grayscale amplification. In this example, since the UI area 930 is subject to grayscale amplification, the UI area 930 fails to be expressed uniformly due to ambient luminance.

Next, (b) of FIG. 8D illustrates an example in which a UI area 930 in an image 925*b* is not subject to high grayscale amplification but the rest of the image 925*b* is subject to high grayscale amplification. Accordingly, since the UI area 930 is not subject to high grayscale amplification, the UI area 930 is able to be expressed uniformly, regardless of ambient luminance.

Specifically, an OSD signal is input to the second reduction unit 790, and the second reduction unit 790 may perform grayscale amplification and extension on areas, except for an OSD area corresponding to the OSD signal, based on coordinate information of the OSD signal.

That is, the second reduction unit 790 may not perform grayscale amplification and extension with respect to the OSD signal.

Accordingly, since the UI area 930 is not subject to high grayscale amplification and extension, the UI area 930 is able to be expressed uniformly, regardless of ambient luminance.

Meanwhile, due to the high grayscale amplification on an area other than the UI area 930, a light source area 940 in the image 925b is subject to extension process so as to have brightness exceeding a 10-bit expression range (0-1023) and thus is able to be expressed brighter.

Meanwhile, the second reduction unit 790 may perform grayscale amplification so that the upper-limit level of grayscale of an image signal is greater than the upper-limit level of grayscale of an OSD signal. In this case, it is desirable to perform grayscale conversion such that the upper-limit level of the OSD signal is significantly smaller than the upper-limit level of the image signal despite the grayscale amplification, or it is desirable that grayscale amplification is not performed in the first place. Accordingly, the OSD area 930 is able to be expressed uniformly, regardless of ambient luminance.

FIGS. 8E and 8F are diagrams referred to for describing grayscale conversion by an HDR processor.

First, referring to FIG. 8E, the HDR processor 705 may perform HDR processing based on a received image signal.

For example, the HDR processor 705 may convert an SDR video into an HDR video or perform grayscale processing for HDR.

For example, as illustrated in (a) of FIG. 8F, the HDR processor 705 may perform grayscale conversion based on a first grayscale conversion curve CVa which highlights low grayscale compared to high grayscale and saturates the high grayscale, or a second grayscale conversion curve CVb which converts the low grayscale and the high grayscale somewhat uniformly.

According to (a) of FIG. 8F, an output vale of low grayscale Lmd in a second grayscale conversion mode is smaller than an output value Lva of low grayscale in a first grayscale conversion mode.

Meanwhile, the HDR processor 705 may perform grayscale conversion based on the first grayscale conversion curve CVa or the second grayscale conversion curve CVb in (a) of FIG. 8F.

Meanwhile, the HDR processor 705 according to an embodiment of the present disclosure may bypass grayscale conversion when a received image signal is an SDR image signal. The HDR processor 705 may perform grayscale conversion when a received image signal is an HDR image signal.

For example, when a received image signal is an HDR image signal, the HDR processor 705 according to an embodiment of the present disclosure may implement a grayscale conversion mode based on the second grayscale conversion curve CVb so that low grayscale and high grayscale are converted uniformly.

An HDR image received from the HDR processing unit 705 may be input to the second grayscale extension unit 729 of the second reduction 790 after passing through the first reduction unit 710 and the enhancement unit 750.

Meanwhile, the second grayscale extension unit 729 may receive OSD information or other information (e.g., subtitle information or logo information) in addition to an image from the enhancement unit 750.

When OSD information or other information (e.g., subtitle information or logo information) is received, the high grayscale amplifier 851 of the second grayscale extension unit 729 may not perform high grayscale amplification on an area corresponding to the OSD information or other information.

Accordingly, the UI area 930 is not subject to high grayscale amplification, as shown in (b) of FIG. 8D, and thus, the UI area 930 may be expressed uniformly, regardless of ambient luminance.

Meanwhile, the high grayscale amplifier 851 may perform high grayscale amplification on an area other than an area corresponding to OSD information or other information in a received HDR image.

Accordingly, amplification and extension processing are performed so that brightness of the light source area 940 in the image 925 exceeds a 10-bit expression range (0-1023), as shown in (b) of FIG. 8D, and thus is able to be expressed brighter.

Meanwhile, the high grayscale amplifier 851 of the second reduction unit 790 may amplify the upper-limit level of grayscale extended by the second reduction unit 790, as shown in (b) of FIG. 8B. Accordingly, expression of high grayscale of a received image may improve.

In particular, the high grayscale amplifier 851 of the second reduction unit 790 may amplify the upper-limit level of the maximum grayscale. Accordingly, expression of high grayscale of a received image may improve.

In (b) of FIG. 8F, a third grayscale conversion curve CVc corresponding to a third grayscale conversion mode and a fourth grayscale conversion curve CVd corresponding to a fourth grayscale conversion mode are exemplarily illustrated.

When the third grayscale conversion mode is implemented, the upper-limit level of the maximum grayscale Lma is La1. When the third grayscale conversion mode is implemented, the upper-limit level of the maximum grayscale Lma is La2 which is much greater than La1.

That is, the high grayscale amplifier 851 of the second reduction unit 790 may amplify the upper-limit level of the maximum grayscale Lma according to the fourth grayscale conversion mode. Accordingly, expression of high grayscale of a received image may improve.

Meanwhile, the high grayscale amplifier 851 of the second reduction unit 790 may perform grayscale extension on an area with a first luminance LMu within a received image signal, as shown in (b) of FIG. 8F.

According to the third grayscale conversion curve CVc in (b) of FIG. 8F, the first luminance LMu is converted to a level lower than the upper-limit level La1. However, according to the fourth grayscale conversion curve CVd, the first luminance LMu is converted to the upper-limit level La1. Thus, according to the fourth grayscale conversion curve CVd, grayscale of the first luminance LMu or higher may be converted to a level between La1 and La2. Hence, expression of high grayscale may improve.

Meanwhile, when grayscale conversion is performed by the HDR processor 705 based on the second grayscale conversion curve CVb in (a) of FIG. 8F, the high grayscale amplifier 851 may perform high grayscale amplification and extension based on the fourth grayscale conversion curve CVd, selected from the third grayscale conversion curve CVc and the fourth grayscale conversion curve CVd, in order to amplify and extend high grayscale of an HDR image.

According to the fourth grayscale conversion curve CVd, grayscale is amplified to a level above the upper-limit level La1, and thus, it is possible to highlight high grayscale and hence highlight an HDR effect more.

That is, according to HDR processing according to an embodiment of the present disclosure, grayscale conversion is performed to highlight both low grayscale and high grayscale by the second grayscale conversion curve CVb, rather than highlighting low grayscale by the first grayscale conversion curve CVa. In addition, the high grayscale amplifier 851 amplifies grayscale to be above the upper-limit level L1 of the fourth grayscale conversion curve CVd in order to amplify high grayscale.

Accordingly, it is possible to highlight the entire grayscale, especially high grayscale, and hence highlight an HDR effect more.

Figure 8G:
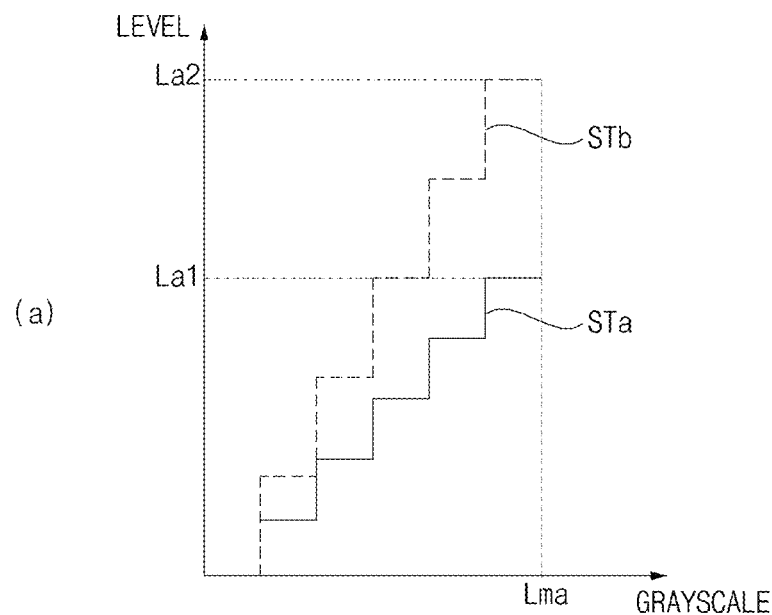
Figure 8G:
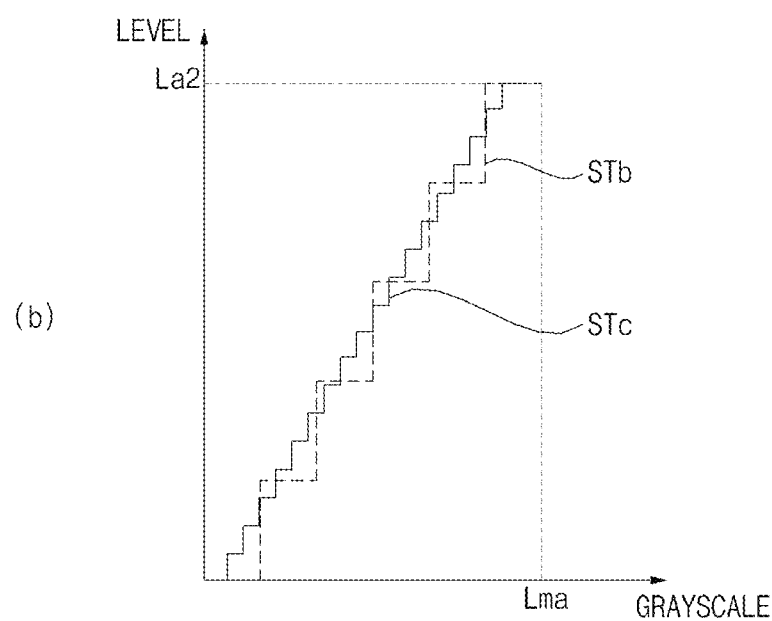

Meanwhile, FIG. 8G is a diagram referred to for describing high grayscale amplification and extension by the second grayscale extension unit 729 of the second reduction unit 790.

First, the high grayscale amplifier 851 of the second grayscale extension unit 729 may amplify an upper-limit level of grayscale of an input signal, as shown in (a) of FIG. 8G.

Specifically, the high grayscale amplifier 851 of the second grayscale extension unit 729 may amplify the upper-limit level of grayscale of an input signal in stages.

In (a) of FIG. 8G, a first amplification mode Sta for amplifying the upper-limit level of grayscale of an input signal to La1, and a second amplification mode STb for amplifying the upper-limit level of grayscale of an input signal to La2 are exemplarily illustrated.

In particular, the high grayscale amplifier 851 of the second grayscale extension unit 729 may amplify the upper-limit level of grayscale of an input signal according to the second amplification mode STb.

Accordingly, expression of high grayscale of a received image may improve.

Meanwhile, the third and fourth decontouring units 852 and 854 may extend grayscale amplified by the high grayscale amplifier 851.

(a) of FIG. 8G, illustrates an example of amplifying the upper-limit level of grayscale of an input signal in approximately five stages according to the second amplification mode STb. (b) of FIG. 8B illustrates an example of extending grayscale of an input signal in stages, more detailed than five stages, according to an extension mode STc.

That is, the third and fourth decontouring units 852 and 854 may extend grayscale of an input signal in more detail, without changing the upper-limit level of the grayscale. Accordingly, expression of high grayscale may improve.

Specifically, the third and fourth decontouring units 852 and 854 in the second reduction unit 790 may uniformly perform grayscale extension on the entire grayscale areas of an input signal.

Due to the above operation of the second grayscale extension unit 729 in the second reduction 790, expression of high grayscale of a received image may improve.

Figure 9A:
Figure 9A:
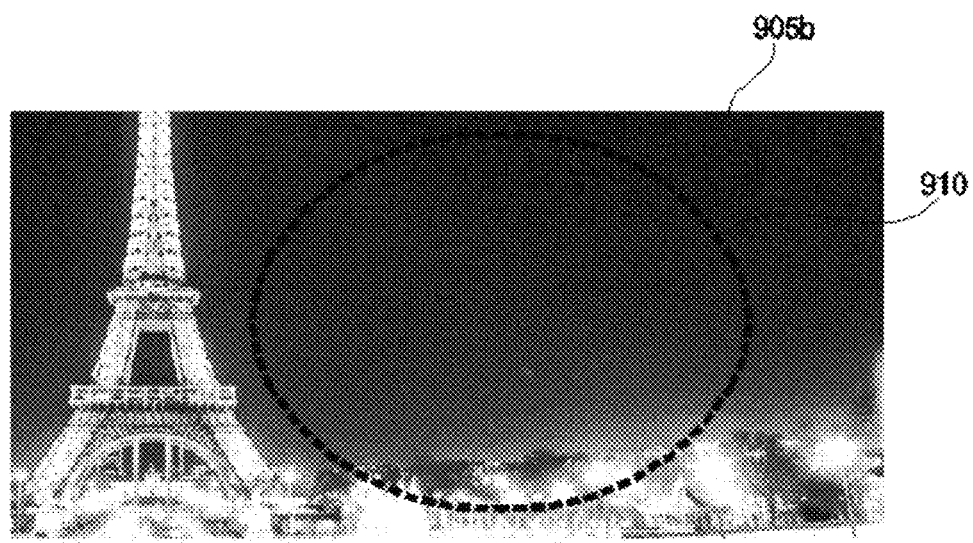

FIG. 9A is a diagram referred to for describing multi-stage grayscale extension.

Referring to the drawing, (a) of FIG. 9A represents a received image signal 905a, and (b) of FIG. 9A represents an image 905b obtained as a result of multi-stage decoutouring. It is found that grayscale of a background area 910 is extended or restored due to the multi-stage decontouring, compared to (a) of FIG. 9A.

For example, even in the case where original grayscale data is 8 bit, the grayscale may be enhanced or extended to 10-bit or higher through multi-stage decontuoring.

Figure 9B:
Figure 9B:
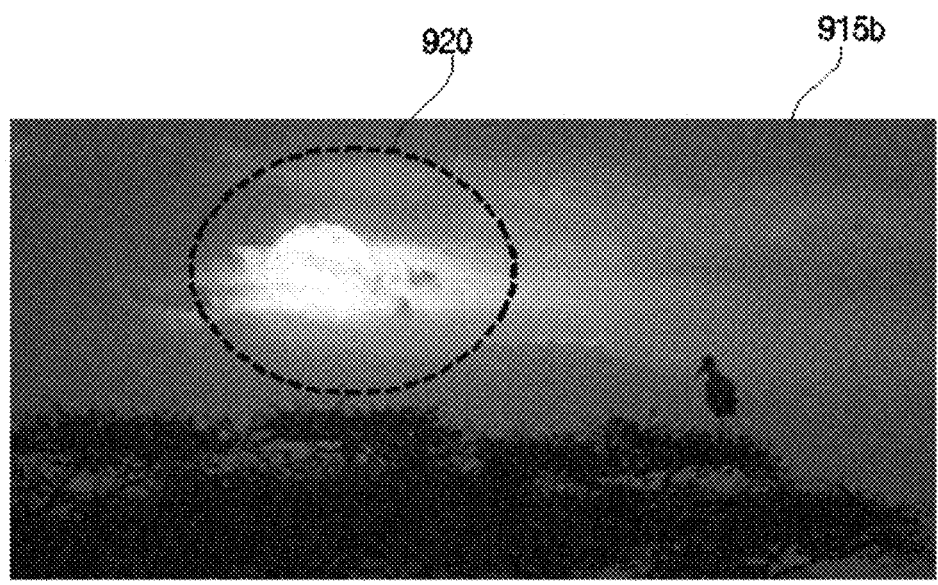

FIG. 9B is a diagram referred to for describing high grayscale amplification.

(a) of FIG. 9B represents a received image signal 915a, and (b) of FIG. 9A represents an image 915b obtained as a result of high grayscale amplification processing by the high grayscale amplifier 851. It is found that a light source area 920 in the image is boosted or amplified due to the high grayscale amplification processing.

In particular, due to the high grayscale amplification by the high grayscale amplifier 851, it is possible to express a brighter area in an original image by amplifying grayscale of the brighter area by 10 bits or more.

Meanwhile, the fourth characteristic of the signal processing device 170 of the present disclosure lies in performing multi-stage resolution enhancement. In particular, the signal processing device 170 performs resolution enhancement in two or more stages. It will be described in more detail with reference to FIG. 10.

Figure 10:
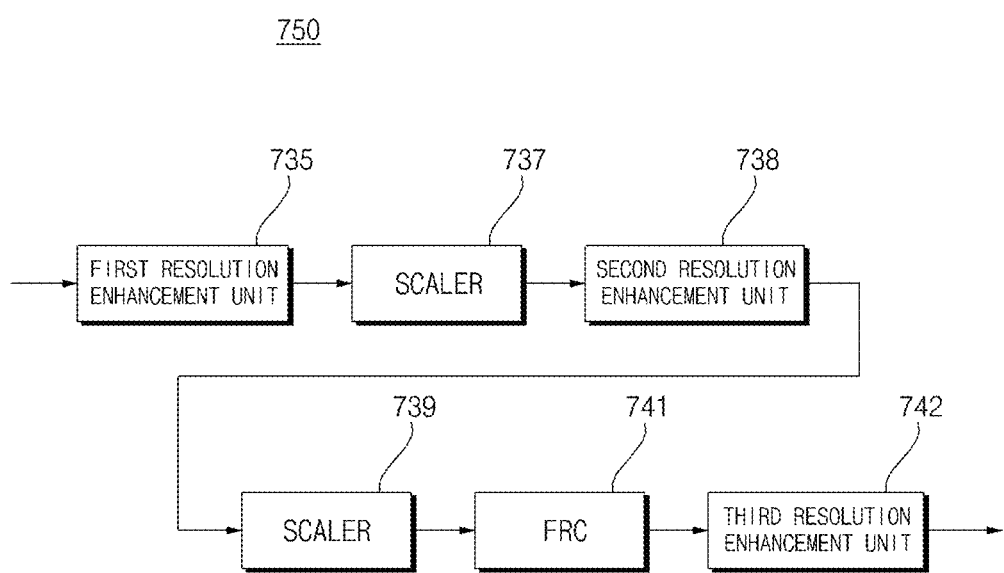

FIG. 10 is a block diagram of the enhancement unit 750 in FIG. 7.

Referring to the drawing, the enhancement unit 750 may include a first resolution enhancement unit 735 for first-stage resolution enhancement, a first scaler 737 for scaling, a second resolution enhancement unit 738 for second-stage resolution enhancement, a second scaler 739 for scaling, a Frame Rate Converter (FRC) 741 for frame rate conversion, and a third resolution enhancement unit 742 for third-stage resolution enhancement.

Due to the scalers 737 and 739 respectively interposed between the resolution enhancement units 735, 738, and 742, it is possible to achieve super-resolution effect. By changing resolution in this process, resolution enhancement may be performed.

For example, if the first resolution enhancement unit 735 performs resolution enhancement-related signal processing based on an Full High Definition (FHD) image whose grayscale is extended by the first grayscale extension unit 725, the first scaler 737 may scale the received FHD image to a 4K image.

In addition, if the second resolution enhancement unit 738 performs resolution enhancement-related signal processing based on the 4K image which is scaled by the first scaler 737, the second scaler 739 may scale the received 4K image to a 4K or higher image. For example, the second scaler 739 may output an overscanned version of the 4K image.

In addition, the third resolution enhancement unit 742 may perform resolution enhancement-related signal processing based on the overscanned version of the 4K image which is scaled by the second scaler 739.

That is, the enhancement unit 750 may perform resolution enhancement in the total three stages through the first resolution enhancement unit 735, the second resolution enhancement unit 738, and the third enhancement unit 742.

Meanwhile, each of the first resolution enhancement unit 735, the second resolution enhancement unit 738, and the third resolution enhancement unit 742 may perform super resolution, peaking, LTI, anti-aliasing processes.

In this case, the first resolution enhancement unit 735, the second resolution enhancement unit 738, and the third resolution enhancement unit 742 may perform resolution enhancement in a multi level hierarchical structure or according to an image size. For example, the first resolution enhancement unit 735, the second resolution enhancement unit 738, and the third resolution enhancement unit 742 may perform resolution enhancement with different filter sizes or different frequency bands.

Accordingly, it is possible to increase intensity or sharpness of resolution enhancement without any side effect, and it is easy to perform tuning for each stage due to resolution enhancement processing in a multi level hierarchical structure.

Figure 11:
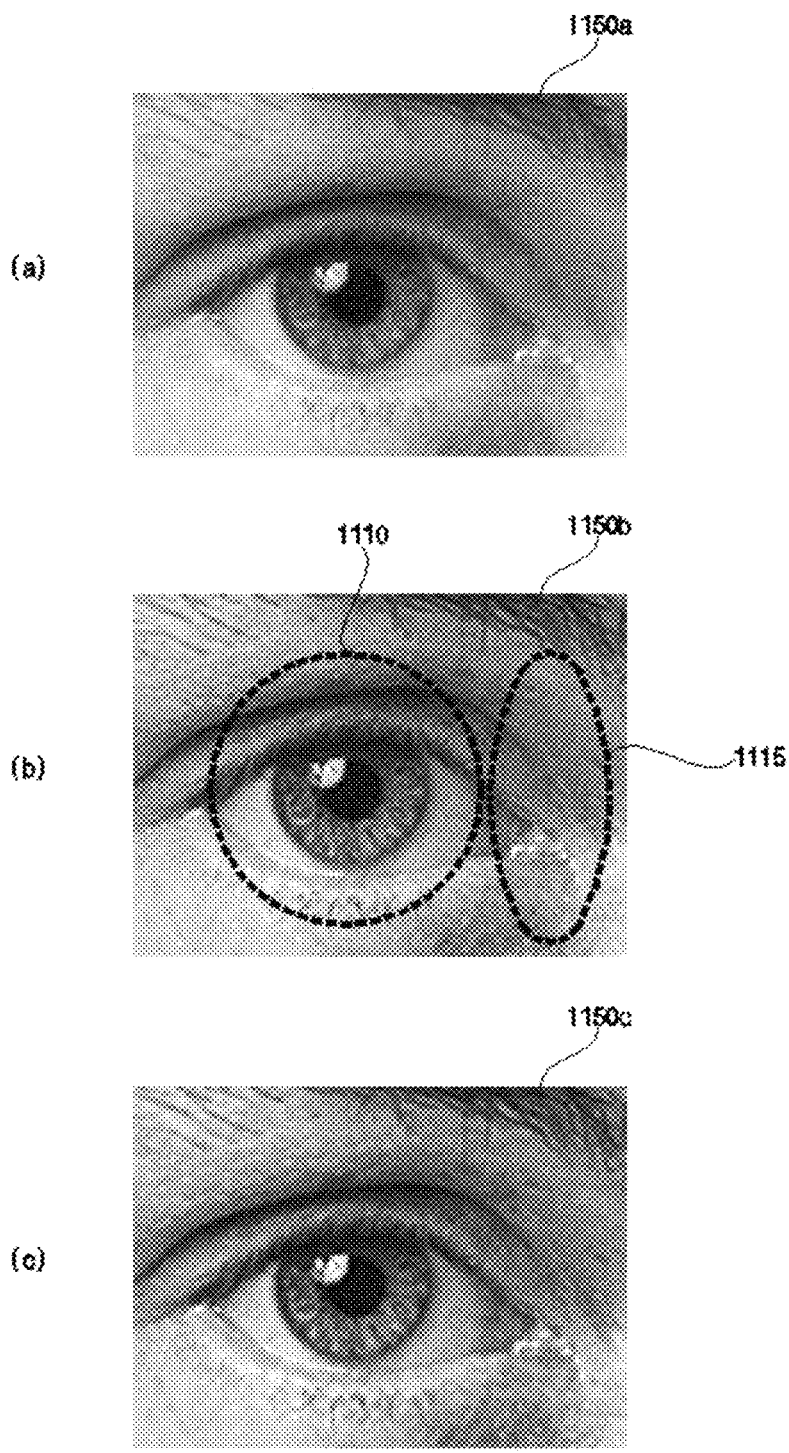

FIG. 11 is a diagram referred to for describing multi-stage grayscale enhancement.

Referring to the drawing, (a) of FIG. 11 represents an original image of a received image signal 1150a, (b) of FIG. 11 represents an image 1150b obtained as a result of multi-stage resolution enhancement, and (c) of FIG. 11 represents an image 1150c obtained as a result of single-stage grayscale enhancement.

Referring to (b) of FIG. 11, unlike the received image signal 1150a in (a) of FIG. 11 and the image 1150c obtained as a result of single-stage grayscale enhancement, an eye area 1110 is displayed more clearly and a skin area 1115 around the eye has a delicate texture and appears clear.

Meanwhile, another characteristic of the signal processing device 170 of the present disclosure lies in process any image quality, including quality of a High Frame Rate (HFR) image, through quality scalable processing.

To this end, the signal processing device 170 of the present disclosure may apply a multi-stage image quality processing technique to an image having a first vertical synchronization frequency (e.g., 60 Hz) or less, as described above, and may apply a single-stage image quality processing technique, not the multi-stage image quality processing technique, to an image having a vertical synchronization frequency greater than the first vertical synchronization frequency (e.g., 60 Hz).

To this end, it is possible to freely connect an input and an output of each core, remap an input/output of each unit of the image quality processor, and perform splitting and merging to distribute inputs to multi cores. In this case, a splitting method may be classified into a spatial splitting method and a temporal splitting method. It will be described in more detail with reference to FIG. 12.

Figure 12:
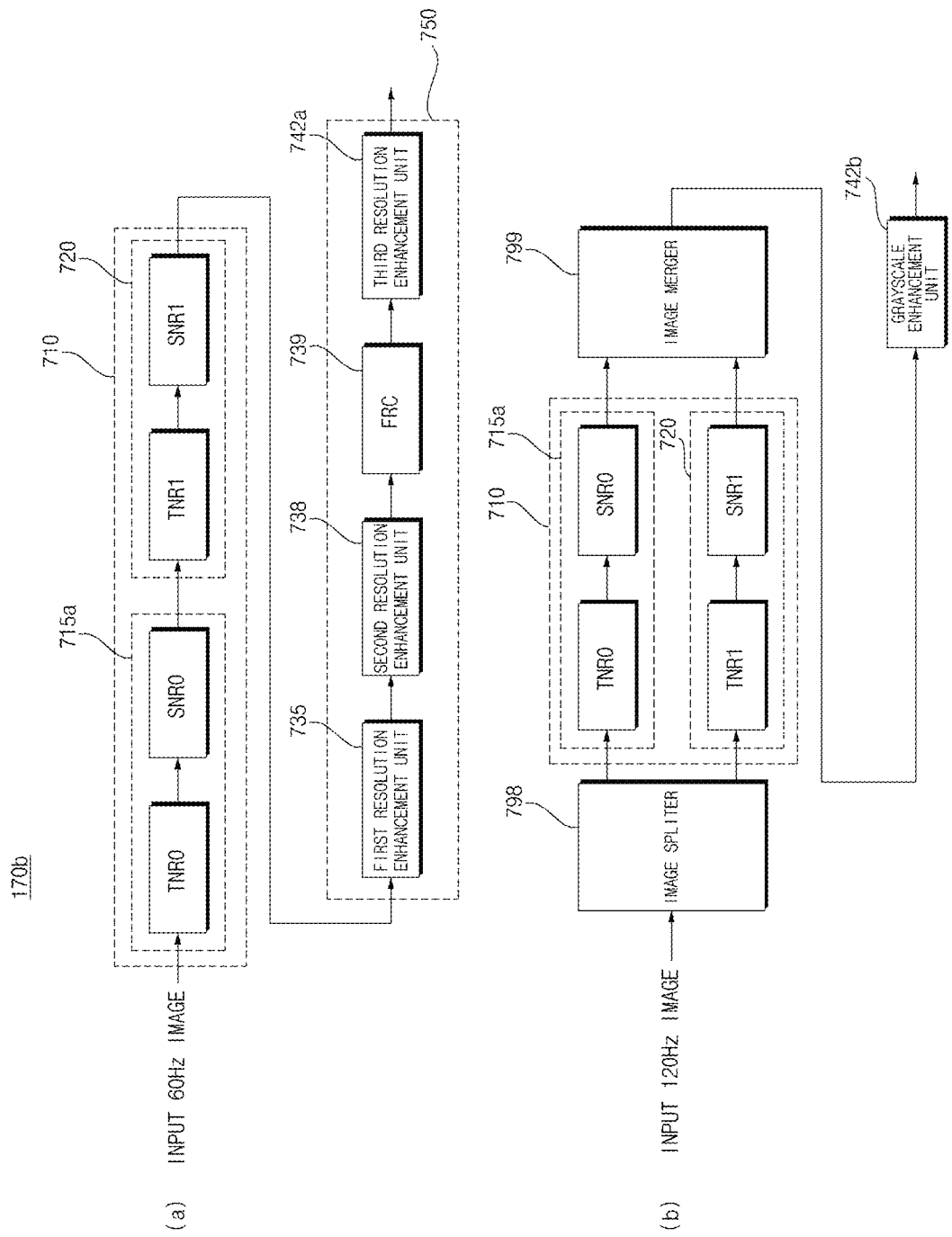

FIG. 12 is a block diagram of a signal processing apparatus 170b according to another embodiment of the present disclosure.

Referring to the drawing, the signal processing device 170b, especially an image quality processor 635, according to another embodiment of the present disclosure may reconfigure the structure of a first reduction unit 710 and a second enhancement unit 750 in a scalable manner according to a vertical synchronization frequency of a received image signal.

That is, the image quality processor 635 may include a first noise reduction unit 715a for performing first-stage noise reduction based on a received image signal when a vertical synchronization frequency of the received image signal is a first vertical synchronization frequency (e.g., 60 Hz), and a second noise reduction unit 720 for performing second-stage noise reduction based on an image received from the first noise reduction unit 715a.

Meanwhile, when a vertical synchronization frequency of a received image signal is a second vertical synchronization frequency (e.g., 120 Hz) higher than the first vertical synchronization frequency (e.g., 60 Hz), the image quality processor 635 may configure the first noise reduction unit 715a and the second noise reduction unit 720 in parallel so as to perform single-stage noise reduction.

For example, when the vertical synchronization frequency of the received image signal is the first vertical synchronization frequency (e.g., 60 Hz), the image quality processor 635 may, similarly as shown in FIG. 7, configure a first reduction unit 710 for multi-stage noise reduction and an enhancement unit 750 for multi-stage resolution enhancement.

The first reduction unit 710 may include a plurality of noise reduction units 715a and 720 for processing temporal noise and spatial noise, and the enhancement unit 750 may include a plurality of resolution enhancement units 735, 738, and 742a for multi-stage resolution enhancement, and a frame rate converter (FRC) 739.

When a vertical synchronization frequency of a received image signal is a second vertical synchronization frequency higher than a first vertical synchronization frequency, an image splitter 798 of the signal processing device 170b may split the received image signal by a spatial splitting method or a temporal splitting method.

Split images may be respectively input to the noise reduction units 715a and 720, and each of the noise reduction units 715a and 720 may perform noise reduction.

Unlike the first vertical synchronization frequency, the split images may go through single-noise reduction (including temporal noise reduction and spatial noise reduction), not multi-stage noise reduction.

In addition, data output from each of the noise reduction units 715a and 720 may be merged by an image merger 799. In addition, resolution enhancement may be performed by the third resolution enhancement unit 742b.

As such, multi-stage noise reduction and multi-stage resolution enhancement may be performed on a received image signal of the first vertical synchronization frequency, and single-stage noise reduction and single-stage resolution enhancement may be performed on a received image signal of the second vertical synchronization frequency.

It is because the received image signal of the second vertical synchronization frequency has a better quality and thus noise reduction and resolution enhancement is possible in a single stage rather than in multiple stages.

As such, by changing a noise reduction method and a resolution enhancement method according to a vertical synchronization frequency of a received image signal, it is possible to perform quality scalable processing and thus process any image quality, including quality of a HFR image.

Meanwhile, another characteristic of the signal processing device 170 of the present disclosure lies in analyzing an image to discover an object and enhance a stereoscopic effect of the object.

To this end, the object stereoscopic effect enhancement unit 745 may extract an object area and a background area from a received image signal, perform contrast enhancement in the object area, and reduce luminance of the background area.

That is, the object stereoscopic effect enhancement unit 745 may process an object and a background differently, and extract a degree of the object relative to the background without given information about the object. In addition, a sense of inconsistency between the processed object and background may be minimized, preventing side effects.

The object stereoscopic effect enhancement unit 740 may output a second image signal with a background area of luminance which is lower than luminance of a background area of a first input image signal input to the image analyzer 610. Accordingly, a stereoscopic effect of an object may be enhanced.

Meanwhile, the object stereoscopic enhancement unit 740 may output a second image signal which is contrast-processed, by performing contrast enhancement based on an object area in the first input image signal input to the image analyzer 610. In this case, it is desirable that contrast of the object area of the first image signal is higher than contrast of an object area of the second image signal. Accordingly, a stereoscopic effect of the object may be enhanced.

Meanwhile, the image analyzer 610 may calculate a probability for the object area of the first image signal and a probability for the background area of the first image signal. Such information may be input to the object stereoscopic effect enhancement unit 740.

The object stereoscopic effect enhancement unit 740 may perform signal processing such that the luminance of the background area of the second image signal decreases in disproportion to the probability for the background area. Accordingly, a stereoscopic effect of the object may be enhanced further.

Meanwhile, the object stereoscopic effect enhancement unit 740 may perform signal processing such that the contrast of the object area of the second image signal increases in proportion to the probability for the object area. Accordingly, a stereoscopic effect of the object may be enhanced further.

Meanwhile, the image analyzer 610 may receive a first image signal corresponding to displaying at least an object and a background, identify information of the object from the first image signal, and identify information of the background from the first image signal.

Meanwhile, the object stereoscopic effect enhancement unit 745 may determine a sharpness of the object using the identified information of the object, increase contrast of the object to enhance the first image signal using the identified information of the object based on the determined sharpness, decrease luminance of the background in the enhanced first image signal using the identified information of the background based on the determined sharpness, and output the enhanced first image signal.

Meanwhile, when the sharpness of the object is a first sharpness level, the contrast of the object may be changed by a first contrast amount.

Meanwhile, when the sharpness of the object is a second sharpness level higher than the first sharpness level, the contrast of the object may be changed by a second contrast amount greater than the first contrast amount.

Meanwhile, as the sharpness of the object increases, the object stereoscopic effect enhancement unit 745 may increase the contrast of the object by a greater amount.

Meanwhile, when the sharpness of the object is the first sharpness, the luminance of the background may be changed by the first luminance level.

Meanwhile, when the sharpness of the object is a second sharpness level higher than the first sharpness level, the luminance of the background may be changed by a second luminance amount greater than the first luminance amount.

Meanwhile, as the sharpness of the object increases, the object stereoscopic effect enhancement unit 745 may decrease the luminance of the background by a greater amount.

Meanwhile, the signal processing device 170 is associated with a display panel for displaying the first image signal and a peak luminance of display panel is increased in response to the decreased luminance of the background.

Meanwhile, the image analyzer 610 may determine a ratio of a size of the object to the background in the first image signal, and the amount of decrease of the luminance of the background is based on the determined ratio.

Meanwhile, when the determined ratio is a first ratio, the amount of decrease of the luminance of the background is a first luminance amount, and when the determined ratio is a second ratio smaller than the first ratio, the amount of decrease of the luminance of the background is a second luminance amount smaller than the first luminance amount.

Meanwhile, as the determined ratio increases, the object stereoscopic effect enhancement unit 745 may decrease the luminance of the background by a greater amount.

Meanwhile, the image analyzer 610 may determine a ratio of a size of the object to the background in the first image signal, and the amount of increase of the contrast of the object is based on the determined ratio.

Meanwhile, when the determined ratio is a first ratio, the amount of increase of the contrast of the object is a first contrast amount, and when the determined ratio is a second ratio smaller than the first ratio, the amount of increase of the contrast of the object is a second contrast amount smaller than the first contrast amount.

Meanwhile, as the determined ratio increases, the object stereoscopic effect enhancement unit 745 may increase the contrast of the object by a greater amount.

The object stereoscopic effect enhancement unit 740 will be described in more detail with reference to FIGS. 13A to 16B.

Figure 13A:
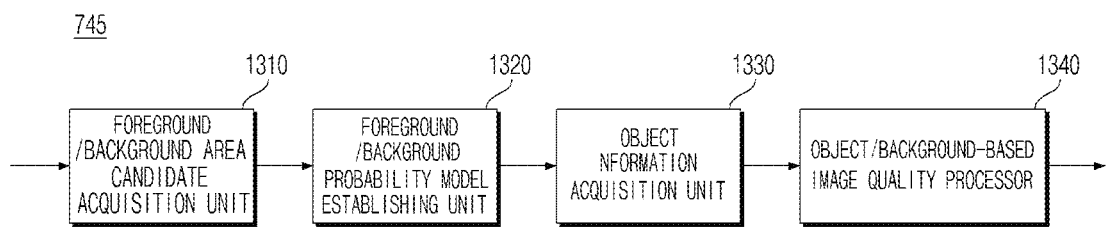

FIG. 13A is an inner block diagram of the object stereoscopic effect enhancement unit shown in FIG. 7.

Referring to the drawing, the object stereoscopic effect enhancement unit 745 may include a foreground/background candidate acquisition unit 1310 for acquiring a foreground/background area candidate, a foreground/background probability model establisher 1320 for establishing a foreground/background probability model, an object information acquisition unit 1330 for acquiring object information, and an object/background-based image quality processor 1340 for processing image quality based on an object/background.

Figure 13B:
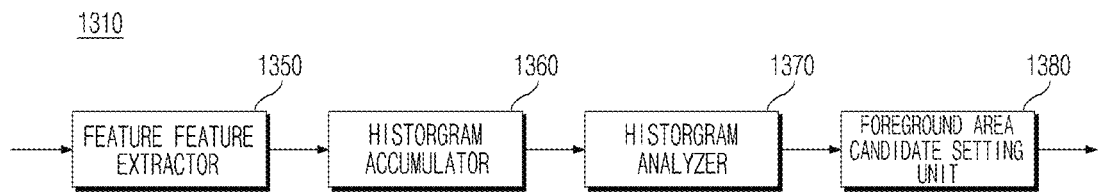

FIG. 13B is an example of an inner block of the foreground/background area acquisition unit 1310 shown in FIG. 13A.

Referring to the drawing, the foreground/background area candidate acquisition unit 1310 may include a feature extractor 1350, a histogram accumulator 1360, a histogram analyzer 1370, and a foreground area candidate setting unit 1380.

The feature extractor 1350 may extract a feature from each pixel of an image. For example, the feature extractor 1350 may extract edge information, skin color, and the like as features.

The histogram accumulator 1360 may accumulate each extracted feature in a histogram in horizontal and vertical directions and analyze the histogram.

The histogram analyzer 1370 may estimate a position of a foreground from information on the analyzed histogram.

The foreground area candidate setting unit 1380 may set a quadrangular foreground area candidate in an image and acquire coordinates of the quadrangular foreground area candidate.

Figure 14A:
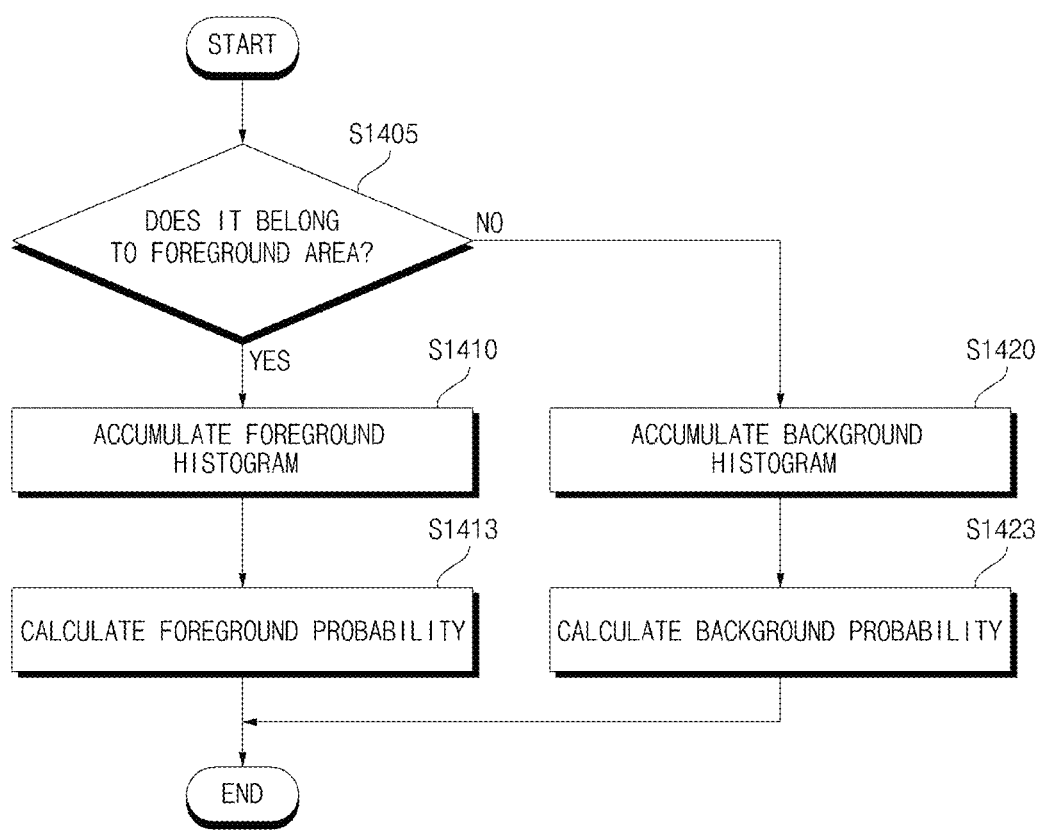

FIG. 14A is a flowchart referred to for describing operation of the foreground/background probability model establishing unit 1320 shown in FIG. 13A.

Referring to the drawing, the foreground/background probability model establishing unit 1320 may determine whether a pixel of a received image signal belongs to a foreground area (S1405).

In addition, when a pixel of the received image signal belongs to the foreground area, the foreground/background probability model establishing unit 1320 may accumulate a foreground histogram (S1410) and calculate a foreground probability (S1413).

Meanwhile, when a pixel of a received image signal does not belong to the foreground area, the foreground/background probability model establishing unit 1320 may determine that the corresponding pixel belongs to a background area, accumulate a background histogram (S1420), and calculate a background probability (S1423).

Accordingly, using a histogram for each area in a received image signal, it is possible to estimate a probability for a pixel to belong to a corresponding area.

Figure 14B:
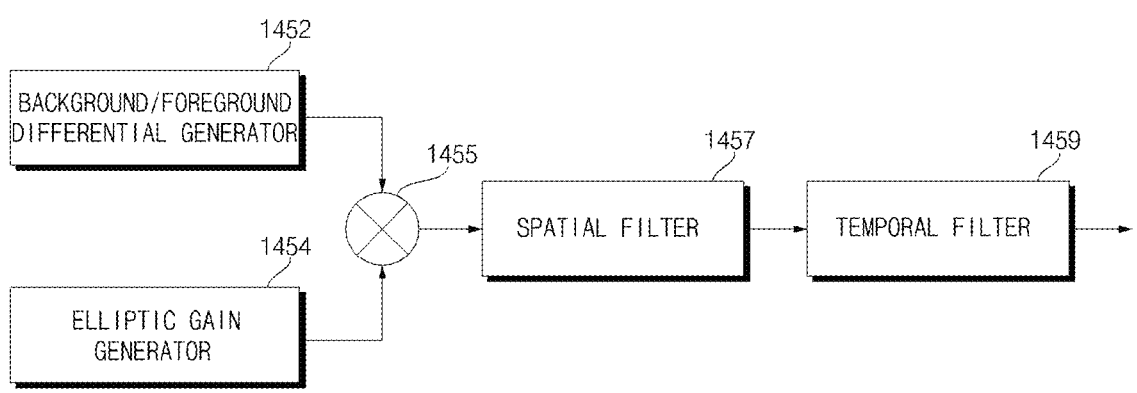

FIG. 14B is a block diagram of the object information acquisition unit 1330 shown in FIG. 7.

Referring to the drawing, the object information acquisition unit 1330 may include a background/foreground differential generator 1452 for generating a background/foreground differential, an elliptic gain generator 1454 for generating an elliptic gain, a multiplier 1455, a spatial filter 1457, and a temporal filter 1459.

The elliptic gain generator 1454 may minimize a sense of inconsistency between an object and a background, by performing coarse modeling on an object outline.

The object information acquisition unit 1330 may calculate a degree of a basic object by multiplying a differential between a foreground probability and a background probability, which is obtained by the background/foreground differential generator 1452, by an elliptic gain, which is obtained by the elliptic gain generator 1454 based on a foreground area candidate.

Meanwhile, in order to reduce noise and achieve stability, the object information acquisition unit 1330 may obtain a degree of a final object by performing spatial and temporal filtering by the spatial filter 1457 and the temporal filter 1459.

Meanwhile, another characteristic of the signal processing apparatus 170 of the present disclosure lies in analyzing an image to discover an object and enhance a stereoscopic effect of the object. It will be described in more detail with reference to FIG. 15.

FIG. 15 is a block diagram of the object/background-based image quality processor 1340 shown in FIG. 7.

Referring to the drawing, the object/background-based image quality processor 1340 may perform image-quality processing based on a received image signal and final object degree information acquired by the object information acquisition unit 1330.

To this end, the object/background-based image quality processor 1340 may include an object image quality processor 1510 for object image-quality processing based on a received image signal and final object degree information, a background image quality processor 1520 for background image quality processing based on the received image signal and the final object degree information, and an image merger 1530.

The image merger 1530 may merge an output from the object image quality processor 1510 and the background image quality processor 1520 and output a merge result.

In particular, the image merger 1530 may output a final image by merging the output from the object image quality processor 1510 and the output from the background image quality processor 1520 according to intensity or sharpness of a final object.

For example, the image merger 1530 may change contrast of an object or luminance of a background area and a foreground area according to intensity or sharpness of a final object.

Specifically, the image merger 1530 may change contrast or luminance such that contrast of the object increases and the lower luminance of the background area decreases disproportionally to intensity or sharpness of the final object. Accordingly, a stereoscopic effect of the object may be enhanced.

Meanwhile, the object/background-based image quality processor 1340 may enhance an image stereoscopic effect by performing a processing operation based on an object map.

Meanwhile, the object/background-based image quality processor 1340 may add a stereoscopic effect by enhancing contrast in an object area.

Meanwhile, the object/background-based image quality processor 1340 may increase peak luminance of the organic light emitting panel 210 by reducing brightness in a background area.

Figure 16A:
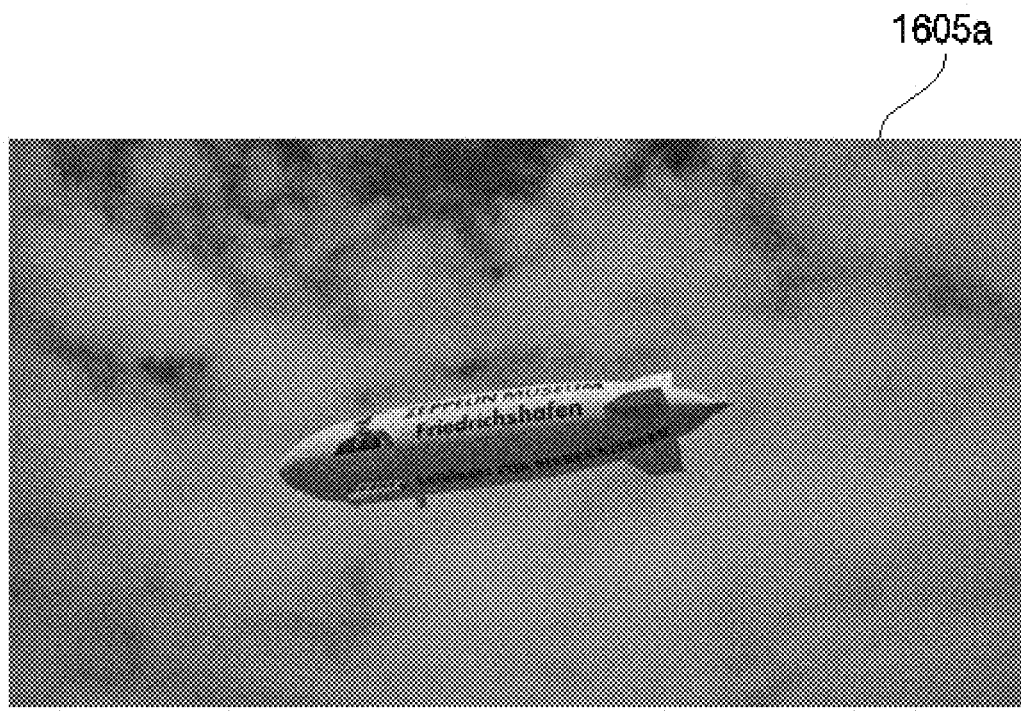
Figure 16B:
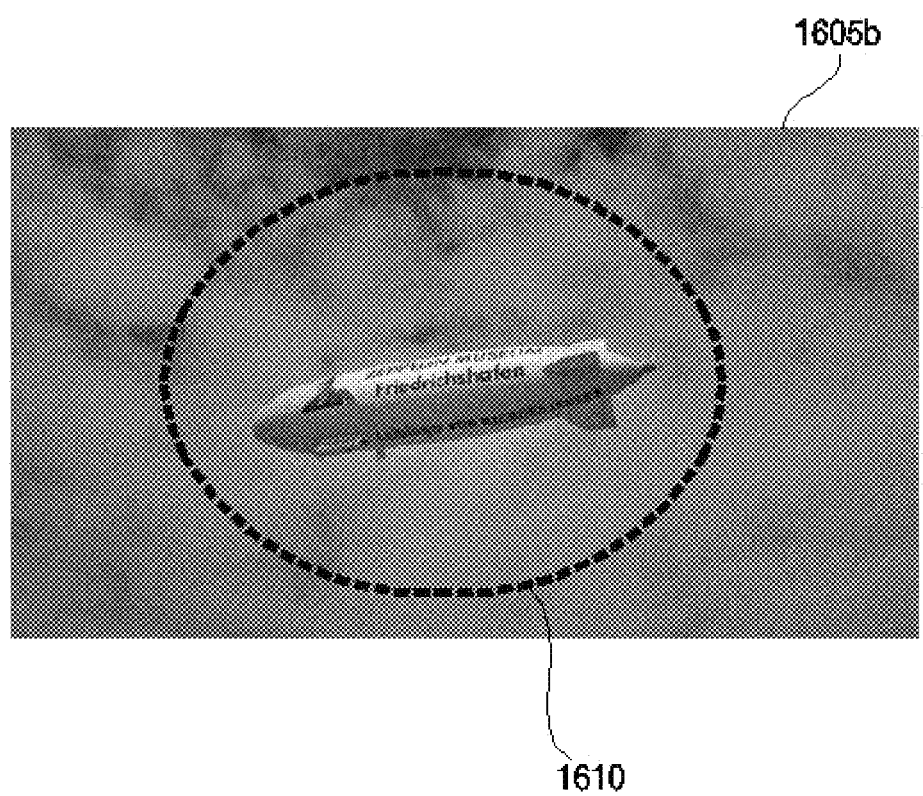

FIGS. 16A and 16B are diagrams referred to for describing an object processing effect.

FIG. 16A illustrates an image 1605a which is output when an object processing operation is not performed, and FIG. 16B illustrates an image 1605b which is output when an object processing operation is performed.

As the object processing operation is performed, a stereoscopic effect of an object area 1610 in the image 1605b may improve and peak luminance thereof may increase.

Meanwhile, another characteristic of the signal processing device 170 of the present disclosure lies in operating in a hierarchical AI structure in which lower-level AI is used to make a determination regarding each IP unit and upper-level AI is used to make a determination regarding the whole. It will be described in more detail with reference to FIG. 17.

FIG. 17 is a block diagram of a signal processing device according to another embodiment o the present disclosure.

Referring to the drawing, a signal processing device 170C according to another embodiment of the present disclosure may include an image analyzer 610 for perform AI analysis on an entire image, and an image quality processor 635c.

The image quality processor 635c may include first to sixth AI image analyzer 1700a to 1700f, a noise reduction unit 1710, an IPC unit 1720, a grayscale extension unit 1730, a resolution enhancement unit 1740, an object stereoscopic effect enhancement unit 1750, and a color contrast enhancement unit 1760 for enhancing color or contrast.

The noise reduction unit 1710 and the resolution enhancement unit 1740 may operate in multiple stages, as described above.

Meanwhile, for the sake of the noise reduction unit 1710, the IPC unit 1720, the grayscale extension unit 1730, the resolution enhancement unit 1740, the object stereoscopic effect enhancement unit 1750, and the color contrast enhancement unit 1760, the first to sixth AI image analyzer 1700a to 1700f may analyze an image for each core.

In addition, the image analyzer 610 may analyze an additional entire image using core-unit information collected by the first to sixth AI image analyzers 1700a to 1700f, and provide corresponding setting.

That is, the signal processing device 170C according to another embodiment of the present disclosure is characterized by having a hierarchical structure when it comes to artificial intelligence processing.

Meanwhile, for the noise reduction unit 1710, the first image analyzer 1700a may measure noise and compute image motion. For the IPC unit 1720, the second image analyzer 1700b may determine a cadence and compute subtitle motion and an image break level. For the grayscale extension unit 1730, the third image analyzer 1700c may compute a degree of compression of an original image, brightness, and resolution. For the resolution enhancement unit 1740, the fourth image analyzer 1700d may compute a frequency, a total edge quantity, and a total texture quantity.

For the object stereoscopic effect enhancement unit 1750, the fifth image analyzer 1700e may compute image distribution, the number of objects, presence of a human, and a foreground-background ratio. For the contrast enhancement unit 1760, the sixth image analyzer 1700f may analyze a histogram, and determine a pattern and continuity of grayscale.

In particular, the fifth image analyzer 1700e may receive a first image signal and separate an object area and a background area of the first image signal.

In addition, the fifth image analyzer 1700e may compute a probability for the object area of the first image signal and a probability for the background area of the first image signal, and transmit information on the computed probabilities to the object stereoscopic effect enhancement unit 1750.

That is, the fifth image analyzer 1700e in FIG. 17 corresponds to operation of the image analyzer 610, and the object stereoscopic effect enhancement unit 1750 in FIG. 17 may correspond to operation of the object stereoscopic effect enhancement unit 740.

In conclusion, according to an embodiment of the present disclosure, it is possible to effectively enhance image quality by performing multi-stage image quality processing.

In particular, in multi-stage noise production, double noise reduction is employed, and thus, the effect of the noise reduction may improve and even noise occurring due to an algorithm such as an IPC algorithm may be reduced.

Meanwhile, three-stage grayscale reproduction is employed, and thus, a lost grayscale bit of a received image signal may be reproduced, thereby providing a smoother picture.

Meanwhile, four-stage grayscale restoration and extension is employed, and thus, a loss of grayscale accompanying with an enhancement process may be restored and a smoother and more dynamic output may be achieved without an aliasing error.

Meanwhile, multi-stage resolution enhancement makes it obtain a more natural and strong resolution enhancement result.

Such a multi-stage image quality processing algorithm may be used to process a 120 Hz image and may be used to perform image quality engine processing based on an HFR image.

In addition, an artificial-intelligent (AI) image quality processing feature such as detecting an object may be introduced and cores may be effectively and organically connected with each other in a hierarchical AI structure, so that an optimal image quality may be provided.

As is apparent from the above description, according to an embodiment of the present invention, there is provided a signal processing device and an image display apparatus including the same according to the present invention comprises: a first reduction unit to receive a image signal and reduce noise of the received image signal, and a second reduction unit to perform grayscale amplification based on the image signal from the first reduction unit, wherein the second reduction unit is configured to perform the grayscale amplification so that upper-limit level of grayscale of the image signal from the first reduction unit is greater than upper-limit level of grayscale of an OSD signal. Accordingly, an OSD area may be expressed uniformly, regardless of ambient luminance.

In particular, the second reduction unit may not perform grayscale extension on the OSD signal so that the OSD area may be expressed uniformly, regardless of ambient luminance.

The OSD signal may be input to the second reduction unit, and the second reduction unit may perform grayscale extension on an area other than the OSD area corresponding to the OSD signal based on coordinate information of the OSD signal. Accordingly, the OSD area may be expressed uniformly, regardless of ambient luminance.

A High Dynamic Range (HDR) processor according to an embodiment of the present disclosure may receive an image signal and perform grayscale conversion on the received image signal, the first reduction unit perform noise reduction based on a grayscale-converted image signal received from the HDR processor, and the second reduction unit may perform grayscale extension based on a noise-reduced image signal received from the first reduction unit, so that an upper-limit level of grayscale extended by the second reduction unit is changed according to a grayscale conversion mode implemented in the HDR processor. Accordingly, expression of high grayscale may improve.

In particular, an upper-limit level of maximum grayscale may be changed and thus expression of high grayscale of a received image may improve.

When a second grayscale conversion mode in which low grayscale is less highlighted is selected from a first grayscale conversion mode and the second grayscale mode and implemented in the HDR processor, the second reduction unit may perform a fourth grayscale conversion mode in which an upper-limit level of grayscale is higher than an upper-limit level of grayscale level of a third grayscale conversion mode. Accordingly, expression of high grayscale may improve.

The HDR processor may implement the first grayscale conversion mode, in which low grayscale is highlighted compared to high grayscale and the high grayscale is saturated, or the second grayscale conversion mode in which the low grayscale and the high grayscale are uniformly converted. When the HDR processor implements the second grayscale conversion mode, the second reduction unit may implement the fourth grayscale conversion mode in which the upper-limit level of grayscale is higher than the upper-limit level of grayscale level of the third grayscale conversion mode. Accordingly, expression of high grayscale may improve.

The second reduction unit may perform grayscale extension on an area with first luminance or higher in a received image signal. Accordingly, expression of high grayscale may improve.

Meanwhile, the first reduction unit may perform multi-stage noise reduction based on a grayscale-converted image signal received from the HDR processor. Accordingly, image quality may be enhanced gradually.

Meanwhile, as multi-stage noise reduction is performed, dual noise reduction is employed to efficiently reduce noise of an original signal and reduce even noise occurring due to an algorithm such as an Interlaced Progressive Conversion (IPC) algorithm.

Meanwhile, due to three-stage grayscale reproduction, a lost grayscale bit of a received image signal is reproduced, thereby providing a smoother picture.

In addition, multi-stage grayscale extension may be performed using the first reduction unit and the second reduction unit, and accordingly, image quality may improve.

Meanwhile, the enhancement unit positioned between the first reduction unit and the second reduction unit performs multi-stage resolution processing based on a noise-reduced image signal received from the first reduction unit, thereby obtaining a more natural and strong resolution enhancement result.

Meanwhile, using a four-stage grayscale restoring process, a loss of grayscale accompanying with an internal enhancement process, thereby obtaining a smoother and more dynamic output without an aliasing error.

In addition, an artificial-intelligent (AI) image quality processing feature such as detecting an object may be introduced and cores may be efficiently and organically connected with each other in a hierarchical AI structure, thereby providing an optimal image quality.

Meanwhile, when a vertical synchronization frequency of a received image signal is a first vertical synchronization frequency, multi-stage noise reduction is performed. When a vertical synchronization frequency of a received image signal is a second vertical synchronization frequency higher than the first vertical synchronization frequency, single-stage noise reduction is performed.

Thus, it is possible to process any image quality, including quality of a High Frame Rate (HFR) image, through quality scalable processing. In particular, it is possible to process any image quality without additional costs.

Although the exemplary embodiments have been illustrated and described, embodiments are not limited to the above-described particular embodiments, various modifications are possible by those skilled in the art without departing from the scope and spirit as disclosed in the accompanying claims and these modifications should not be understood separately from the scope and spirit.

What is claimed is:

1. A signal processing device comprising:
 a reducer configured to receive an image signal and reduce noise of the received image signal; and
 a grayscale extender electrically coupled to the reducer and configured to:
  perform grayscale amplification based on the image signal received by the reducer;
  perform the grayscale amplification so that an upper-limit level of a grayscale of the image signal is greater than an upper-limit level of a grayscale of an on screen display (OSD) signal;
  amplify an upper-limit level of a maximum grayscale of the image signal from a first level to a second level greater than the first level, and not amplify an upper-limit level of a maximum grayscale of the OSD signal; and
  change the amplified gray scale of the image signal from a first mode to a second mode having more detailed luminance interval than the first mode.

2. The signal processing device of claim 1, wherein the OSD signal is input to the grayscale extender, and
 wherein the grayscale extender is further configured to perform grayscale amplification on an area except for an OSD area corresponding to the OSD signal.

3. The signal processing device of claim 1, further comprising:
 a high definition resolution (HDR) processor configured to receive the image signal and perform gray scale conversion on the image signal received by the HDR processor,
 wherein the reducer is further configured to reduce noise of grayscale-converted image signal received from the HDR processor, and
 wherein the upper-limit level of the grayscale amplified by the grayscale extender is varied according to a mode of the grayscale conversion, a first grayscale conversion mode, performed by the HDR processor.

4. The signal processing device of claim 3, wherein when a second grayscale conversion mode in which a low grayscale is not emphasized compared to the first gradation mode, is performed by the HDR processor, the grayscale extender is further configured to perform a fourth grayscale conversion mode corresponding to the second grayscale conversion mode between a third grayscale conversion mode corresponding to the first grayscale conversion mode and the fourth grayscale conversion mode, and
 wherein an upper-limit level of a grayscale of the fourth grayscale conversion mode is greater than an upper-limit level of a grayscale of the third grayscale conversion mode.

5. The signal processing device of claim 3, wherein the HDR processor is further configured to perform grayscale conversion based on the first grayscale conversion mode in which a low grayscale is highlighted compared to a high grayscale and the high grayscale is saturated, or based on a second grayscale conversion mode in which a low grayscale and a high gray scale are converted uniformly,
 wherein when the second grayscale conversion mode is performed by the HDR processor, the grayscale extender is further configured to perform a fourth grayscale conversion mode corresponding to the second grayscale conversion mode between a third grayscale conversion mode corresponding to the first grayscale conversion mode and the fourth grayscale conversion mode, and
 wherein an upper-limit level of a grayscale of the fourth grayscale conversion mode is greater than an upper-limit level of a grayscale of the third grayscale conversion mode.

6. The signal processing device of claim 5, wherein an output value of the low grayscale in the second grayscale conversion mode is smaller than an output value of the low grayscale in the first grayscale conversion mode.

7. The signal processing device of claim 3, wherein the reducer is further configured to perform multi-stage noise reduction based on the grayscale-converted image signal received from the HDR processor.

8. The signal processing device of claim 1, wherein the reducer is further configured to increase a grayscale resolution in a first-stage, and
 wherein the grayscale extender is further configured to increase a grayscale resolution in a second-stage.

9. The signal processing device of claim 1, further comprising an enhancement processor positioned between the reducer and the grayscale extender and configured to perform multi-stage resolution enhancement based on a noise-reduced image signal received from the reducer.

10. The signal processing device of claim 1, wherein the reducer comprises a plurality of noise reducers configured to reduce noise of the received image signal in multiple stages, and
 wherein each of the plurality of noise reducers comprises:
  a temporal noise reducer configured to perform temporal noise reduction using previous frame data; and
  a spatial noise reducer configured to perform spatial noise reduction using data around current frame data.

11. The signal processing device of claim 10, wherein when the received image signal is an interlaced video, a first noise reducer of the plurality of noise reducers is configured to perform interlaced progressive conversion.

12. The signal processing device of claim 1,
 wherein the grayscale extender comprises:
  a first decontourer for performing first-stage decontouring;
  a second decontourer for performing second-stage decontouring; and
  a ditherer for performing dithering.

13. The signal processing device of claim 1, wherein the grayscale extender is further configured to perform grayscale extension on an area with a first luminance or a luminance higher than the first luminance within the image signal.

14. The signal processing device of claim 1, wherein the first reducer comprises:
a first noise reducer for performing first-stage noise reduction based on the received image signal;
a second noise reducer for performing second-stage noise reduction based on the image signal from the first noise reducer,
wherein the grayscale extender is further configured to perform grayscale amplification based on the image signal from the second noise reducer, and
wherein the grayscale extender is further configured to perform the grayscale amplification so that the upper-limit level of the grayscale of the image signal is greater than the upper-limit level of the grayscale of then OSD signal.

15. The signal processing device of claim 14, wherein the grayscale extender is further configured to not perform grayscale amplification with respect to the OSD signal.

16. The signal processing device of claim 14, wherein the OSD signal is input to the grayscale extender, and
wherein the grayscale extender is further configured to perform grayscale amplification on an area except for an OSD area corresponding to the OSD signal, based on coordinate information of the OSD signal.

17. An image display apparatus comprising:
a display; and
a signal processing device to output an image signal to the display,
wherein the signal processing device comprises:
a reducer configured to receive an image signal and reduce noise of the received image signal; and
a grayscale extender electrically coupled to the reducer and configured to:
perform grayscale amplification based on the image signal received by the reducer;
perform the grayscale amplification so that an upper-limit level of a grayscale of the image signal is greater than an upper-limit level of a grayscale of an on screen display (OSD) signal;
amplify an upper-limit level of a maximum grayscale of the image signal from a first level to a second level greater than the first level, and not amplify an upper-limit level of a maximum grayscale of the OSD signal; and
change the amplified gray scale of the image signal from a first mode to a second mode having more detailed luminance interval than the first mode.

18. The image display apparatus of claim 17, wherein the OSD signal is input to the grayscale extender, and
wherein the grayscale extender is further configured to perform grayscale amplification on an area except for an OSD area corresponding to the OSD signal.

* * * * *